United States Patent
Toyoda et al.

(10) Patent No.: US 7,002,227 B2
(45) Date of Patent: Feb. 21, 2006

(54) PRESSURE DETECTING DEVICE

(75) Inventors: Inao Toyoda, Anjo (JP); Teruo Oda, Gamagori (JP); Seiichirou Otake, Hazu-gun (JP); Hiroaki Tanaka, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/759,122

(22) Filed: Jan. 20, 2004

(65) Prior Publication Data

US 2004/0169242 A1   Sep. 2, 2004

(30) Foreign Application Priority Data

Feb. 28, 2003 (JP) .............................. 2003-053710
Mar. 14, 2003 (JP) .............................. 2003-069380

(51) Int. Cl.
*H01L 29/84* (2006.01)

(52) U.S. Cl. ...................... 257/417; 257/415
(58) Field of Classification Search ............... 257/415, 257/417–418
See application file for complete search history.

(56) References Cited

U.S. PATENT DOCUMENTS

| | | | |
|---|---|---|---|
| 3,786,320 A | 1/1974 | Kano et al. | |
| 4,011,577 A | 3/1977 | Tanimura et al. | |
| 4,567,395 A | 1/1986 | Pundarika | |
| 4,570,097 A | 2/1986 | Shukla et al. | |
| 4,590,400 A | 5/1986 | Shukla et al. | |
| 4,645,965 A | 2/1987 | Paganelli | |
| 5,349,873 A | 9/1994 | Omura et al. | |
| 5,488,868 A * | 2/1996 | Ootake et al. | 73/708 |
| 5,528,069 A | 6/1996 | Mladenovic et al. | |
| 5,583,295 A | 12/1996 | Nagase et al. | |
| 2004/0182165 A1 * | 9/2004 | Miyashita | 73/718 |

FOREIGN PATENT DOCUMENTS

JP          10300604 A   * 11/1998
JP     A-2001-74582        3/2001

* cited by examiner

*Primary Examiner*—Allan R. Wilson
(74) *Attorney, Agent, or Firm*—Posz Law Group, PLC

(57) ABSTRACT

A pressure detecting device includes a semiconductor substrate (30, 200, 300, 400) for outputting an electrical signal corresponding to an applied pressure received from a pressure transmitting member (20) having electrically conductive properties disposed on the front surface of the semiconductor substrate (30, 200, 300, 400). The substrate (30, 200, 300, 400) and the pressure transmitting member (20) are accommodated in a housing (10). A lead member (50) electrically independent of the housing (10) is accommodated in the housing (10) at the back surface side of the semiconductor substrate (30, 200, 300, 400), and the lead member (50) and an electrode (35b) of the substrate (30, 200, 300, 400) are electrically connected to each other through conductive adhesive material (40). The housing (10) preferably includes a first portion (101), a second portion (102) having smaller thermal conductivity than the first portion, and an electrically conductive partition portion (103).

21 Claims, 8 Drawing Sheets

PRESSURE DETECTING DEVICE

CROSS REFERENCE TO RELATED APPLICATIONS

This application is based upon, claims the benefit of priority of, and incorporates by reference the contents of, Japanese Patent Application No. 2003-53710 filed on Feb. 28, 2003 and Japanese Patent Application No. 2003-69380 filed on Mar. 14, 2003.

FIELD OF THE INVENTION

The present invention relates generally to a pressure detecting device and, more particularly, to a pressure detecting device including a semiconductor substrate as a pressure detecting element and a pressure transmitting member for transmitting pressure to the semiconductor substrate, the pressure detecting element and the pressure transmitting member being accommodated in a housing.

BACKGROUND OF THE INVENTION

A semiconductor substrate having a piezoelectric effect outputs an electrical signal in accordance with pressure applied in a spacing direction between both the front (top) and back surfaces of the semiconductor substrate, that is, in the thickness direction of the semiconductor substrate. A resistance variation of the semiconductor substrate that corresponds to distortion caused by application of pressure is used for measuring pressure.

JP-A-7-253364, JP-A-7-19981 and Japanese Patent No. 3,166,015 disclose pressure detecting devices that include a semiconductor substrate as a pressure detecting element. In these pressure detecting devices, a semiconductor substrate and a pressure transmitting member for transmitting pressure to the semiconductor substrate are accommodated in a metal housing. Furthermore, a detecting electrode is equipped to the front surface of the semiconductor substrate, a lead member is equipped to the outer periphery of the semiconductor substrate and the electrode and the lead member are connected to each other by wire bonding to receive a signal.

When such a pressure detecting device as described above is applied to a combustion pressure sensor for an engine, the accommodating portion of the pressure transmission member of the housing is inserted in a hole of the engine block, and the pressure in the combustion chamber is received by the pressure transmission member and transmitted to the semiconductor substrate to thereby detect the pressure.

Current design requirements necessitate engines that are compact and size and light in weight. Accordingly, the mount space of the pressure detecting device is also required to be reduced in size. Therefore, it is also required to reduce the diameter (size) of the pressure detecting device, that is, the diameter (size) of the housing.

However, the conventional pressure detecting device has a constraint that has prevented a reduction in size of the housing. More particularly, in the conventional pressure detecting device as described above, because the semiconductor substrate and the lead member are bonded to each other by wire bonding, the lead member is located on the outer periphery of the semiconductor substrate. Therefore, the wire bonding portion containing the lead member is larger in size than the semiconductor substrate, and the diameter of the housing is determined by the size of the wire bonding portion, which is largest among the parts accommodated in the housing. More fully, the minimum diameter of the housing is constrained by the size of the wire bonding portion. However, because the wire bonding portion is larger than the semiconductor substrate, a restriction is imposed on the reduction in size of the pressure detecting device.

With respect to this problem, the inventor has experimented with designing the pressure detecting device to include electrodes equipped on the front and back surfaces of the semiconductor substrate. Also, the semiconductor substrate was sandwiched by a part of the metal housing and lead members. Accordingly, no wire bonding was expected to be required for lead-out of the electrodes on both the front and back surfaces concerned and the size (diameter) of the housing could be reduced.

With this design, in order to establish electrical conductivity, the housing at the front surface side of the semiconductor substrate, that is, the housing at the pressure-applied side of the semiconductor substrate is required to be formed of metal. More particularly, if the entire housing is formed of metal, it would be simply expected that a semiconductor-substrate sandwiched type electrode lead-out construction can be adopted. However, if the entire housing is formed of metal, in the case of a combustion pressure sensor as described above or the like, one end of the housing is exposed to a high-temperature measurement environment in a combustion chamber or the like and the high heat of the combustion chamber or the like is transmitted through the housing to the semiconductor substrate connected to a part of the housing. Therefore, the semiconductor substrate is increased to a high temperature, which may cause an operation error and lead to operational difficulties.

SUMMARY OF THE INVENTION

Therefore, the present invention has been implemented in view of the foregoing problems, and has a first object to provide a pressure detecting device having a proper construction to enable reduction of the size (diameter) of a housing. A second object is to provide a pressure detecting device that can suppress increase in temperature of the semiconductor substrate while reducing the diameter (size) of the housing.

The pressure detecting device includes a semiconductor substrate for outputting an electrical signal in accordance with pressure applied in a direction in which both the front and back surfaces of the semiconductor substrate are spaced from each other, a pressure transmitting member having electrically conductive properties and that is equipped at the front surface side of the semiconductor substrate to transmit pressure to the front surface side of the semiconductor substrate, and a housing in which the semiconductor substrate and the pressure transmitting member are accommodated.

The semiconductor substrate has a first electrode on the front surface thereof and a second electrode on the back surface thereof so that an electrical signal may be output through the first electrode and the second electrode when the pressure is applied. The first electrode is electrically connected to the pressure transmitting member.

A lead member electrically independent of the housing is accommodated in the housing at the back surface side of the semiconductor substrate. The lead member and the second electrode of the semiconductor substrate are electrically connected to each other.

According to the first aspect of this invention the semiconductor device is designed so that the electrodes are equipped on the front and back surfaces thereof and both the front and back surfaces are sandwiched by the conductive pressure transmitting member and the lead member, so that no wire boding is required for lead-out of the electrode on each of the front and back surfaces of the semiconductor substrate. Therefore, according to this first aspect, a pressure detecting device having a construction suitable to reduce the size of a housing can be provided.

Furthermore, according to a second aspect of this invention, in the pressure detecting device of the first aspect, the first electrode is disposed at the peripheral portion on the front surface of the semiconductor substrate, the pressure from the pressure transmitting member is transmitted to the center portion on the front surface of the semiconductor substrate, and the first electrode and the pressure transmitting member are electrically connected to each other through conductive adhesive material.

According to this aspect, the pressure from the pressure transmitting member is directly applied to the semiconductor substrate through the first electrode to thereby prevent or significantly limit transmission loss of the pressure.

Still furthermore, according to a third aspect of this invention, the first electrode of the first aspect is designed in a ring shape. According to this aspect, the first electrode is designed so as to surround the pressure transmitting member equipped at the center portion on the front surface of the semiconductor substrate. Therefore, the connection between the pressure transmitting member and the first electrode can be easily performed by the conductive adhesive material.

According to a fourth aspect of this invention, the semiconductor substrate of the first aspect is an N-type silicon substrate having a plane direction corresponding to (110)-plane. The pressure from the pressure transmitting member is transmitted to the center portion on the front surface of the substrate. The substrate includes a first N-type diffusion layer equipped at a peripheral portion on the front surface of the N-type silicon substrate, a P-type diffusion gage layer that is continuously formed so as to extend from the vicinity of the first N-type diffusion layer through the center portion of the N-type silicon substrate to the other peripheral portion, and a second N-type diffusion layer equipped on the back surface of the N-type silicon substrate. The P-type diffusion gage layer is electrically connected to the first electrode at the other peripheral portion on the front surface of the N-type silicon substrate and the second N-type diffusion layer is electrically connected to the second electrode on the back surface of the N-type silicon substrate. A third electrode for electrically connecting the first N-type diffusion layer and the P-type diffusion gage layer is equipped at the peripheral portion on the front surface of the N-type silicon substrate.

The semiconductor substrate of the pressure detecting device according to the first aspect of this invention may be constructed as described above. According to the semiconductor substrate comprising the N-type silicon substrate having a plane direction corresponding to the (110)-plane, the pressure detection can be performed as follows.

A voltage is applied to the semiconductor substrate, or, more particularly, to the N-type silicon substrate so that the second electrode is set to a positive potential and the first electrode is set to a negative potential through the pressure transmitting member and the lead member.

In this case, current flows from the second electrode through the second N-type diffusion layer, the inside of the N-type silicon substrate, the first N-type diffusion layer, the third electrode, the P-type diffusion gage layer and the first electrode in this order. At this time, in the P-type diffusion gage layer, current flows mainly along the <110> crystal axis direction.

When pressure is applied to the N-type silicon substrate in the spacing direction of both the front and back surfaces and thus the N-type silicon substrate is deformed in the thickness direction thereof, the resistance value along the <110> crystal axis direction in the P-type diffusion gage layer is varied. Therefore, the pressure detection can be performed by outputting the current or voltage variation caused by the application of the pressure as an electrical signal from the first electrode and the second electrode.

Furthermore, according to a fifth aspect of this invention, the P-type diffusion gage layer has such a shape that the longitudinal direction of resistance is along the <110> crystal axis direction of the N-type silicon substrate at the center portion on the front surface of the N-type silicon substrate. According to this aspect of this invention, the variation of the resistance value in the <110> crystal axis direction in the P-type diffusion gage layer can be intensified at the center portion on the front surface of the N-type silicon substrate to which the pressure is applied from the pressure transmitting member, and thus the pressure detection can be performed with high precision.

Still furthermore, according to a sixth aspect of this invention, the semiconductor substrate of the first aspect is a P-type silicon substrate having a plane direction corresponding to (110)-plane. The pressure from the pressure transmitting member is transmitted to the entire portion on the front surface of the P-type silicon substrate. The substrate includes a first P-type diffusion layer electrically-connected to the first electrode and equipped on the front surface of the P-type silicon substrate, a second P-type diffusion layer electrically-connected to the second electrode and equipped on the back surface of the P-type silicon substrate, and the first P-type diffusion layer and the second P-type diffusion layer are respectively disposed at one peripheral portion and the other peripheral portion which confront each other through the center portion of the P-type silicon substrate along the <110> crystal axis direction.

The semiconductor substrate according to the first aspect may be constructed as described above. According to the semiconductor substrate comprising the P-type silicon substrate whose plane direction corresponds to the (110)-plane, the pressure detection can be performed as follows.

When a voltage is applied across the first electrode and the second electrode through the pressure transmitting member and the lead member, current flows from one of the first and second P-type diffusion layers through the inside of the P-type silicon substrate to the other P-type diffusion layer mainly along the <110> crystal axis direction.

When pressure is applied to the P-type silicon substrate in the spacing direction of both the front and back surfaces thereof and thus the P-type silicon substrate is deformed in the thickness direction thereof, the resistance value along the <110> crystal axis direction in the P-type silicon substrate is varied. Therefore, the pressure detection can be performed by outputting the current or voltage variation caused by the application of the pressure as an electrical signal from the first and second electrodes.

Furthermore, according to a seventh aspect of this invention, the P-type silicon substrate of the sixth aspect is designed in a rectangular planar shape, the <110> crystal axis direction thereof is along a diagonal direction of the P-type silicon substrate, and the first P-type diffusion layer (201) and the second P-type diffusion layer (202) confront each other along the diagonal direction of the P-type silicon substrate.

According to the seventh aspect of this invention, in the rectangular P-type silicon substrate, the distance between the first P-type diffusion layer and the second P-type diffusion layer is increased, that is, the current path along the <110> crystal axis direction can be lengthened, and the variation of the resistance value can be intensified, so that the detection sensitivity can be enhanced.

According to an eighth aspect of this invention, the semiconductor substrate of the first aspect is a P-type silicon substrate having a plane direction corresponding to a (110)-plane. The pressure from the pressure transmitting member is transmitted to the center portion on the front surface of the P-type silicon substrate. The substrate includes a P-type diffusion gage layer electrically-connected to the first electrode at a peripheral portion of the P-type silicon substrate and on the front surface of the P-type silicon substrate. The P-type diffusion gage layer has such a shape as to extend from the peripheral portion on the front surface of the P-type silicon substrate to the other peripheral portion along the <110> crystal axis direction. An N-type diffusion layer electrically-connected to the first electrode is formed at the peripheral portion and on the front surface of the P-type silicon substrate so as to be located between the P-type diffusion gage layer and the inside of the P-type silicon substrate to cover the P-type diffusion gage layer, except for the area corresponding to the end portion of the P-type diffusion gage layer at the other peripheral portion side. A P-type diffusion layer electrically-connected to the second electrode is equipped on the back surface of the P-type silicon substrate.

Furthermore, the semiconductor substrate according to the first aspect may be constructed as described above. According to the semiconductor substrate comprising the P-type silicon substrate whose plane direction corresponds to the (110)-plane, the pressure detection can be performed as follows.

A voltage is applied to the semiconductor substrate, or, more particularly, to the P-type silicon substrate so that the first electrode is set to a positive potential and the second electrode is set to a negative potential through the pressure transmitting member and the lead member and the second electrode.

In this case, current flows from the first electrode through the P-type diffusion gage layer, the inside of the P-type silicon substrate, the P-type diffusion layer and the second electrode in this order. At this time, current flows in the P-type gage layer mainly along the <110> crystal axis direction.

Furthermore, at this time, the N-type diffusion layer covering the P-type diffusion gage layer secures electrical insulation between the P-type diffusion gage layer and the inside (P-type portion) of the P-type silicon substrate, and keeps the current flow described above.

When pressure is applied to the P-type silicon substrate in the spacing direction of both the front and back surfaces thereof and thus the P-type silicon substrate is deformed in the thickness direction thereof, the resistance value along the <110> crystal axis direction in the P-type diffusion gage layer is varied. Therefore, the pressure detection can be performed by outputting the current or voltage variation caused by the pressure application as an electrical signal from the first and second electrodes.

According to a ninth aspect of this invention, on the front surface of the semiconductor substrate of the fourth to eighth aspects, the pressure transmitting member is disposed so as to face the center portion, and the first electrode is disposed to be nearer to the peripheral portion side than the pressure transmitting member and electrically connected to the pressure transmitting member through the conductive adhesive material.

According to this aspect, the fourth to eighth aspects of this invention have the same effect as the second aspect of this invention.

Furthermore, according to a tenth aspect of this invention, the housing has electrically conductive properties, and the first electrode is electrically connected to the housing through the pressure transmitting member, whereby the first electrode is allowed to be electrically connected to the external.

According to this aspect, the housing can be used as a terminal, and the electrical connection construction of the pressure detecting device can be simplified.

Still furthermore, according to an eleventh aspect of this invention, the pressure transmitting member and the housing of the tenth aspect are equipped with a conductive layer having electrical resistance lower than the pressure transmitting member and the housing.

According to this aspect, the electrical resistance can be reduced in the current path between the first electrode and the external, and this is preferable.

As stated above, a second object is to provide a pressure detecting device that can suppress increase in temperature of the semiconductor substrate while reducing the diameter (size) of the housing. In order to achieve the second object of the invention, in a twelfth aspect of the invention, the housing comprises a first portion, a second portion having smaller thermal conductivity than the first portion and an electrically conductive partition portion through which the first portion and the second portion are separated from each other.

The semiconductor substrate is accommodated in the first portion of the housing, and the pressure transmitting member is accommodated in the second portion of the housing so that pressure is transmitted through the partition portion to the front surface of the semiconductor substrate.

The semiconductor substrate has a first electrode on the front surface thereof and a second electrode on the back surface thereof, and an electrical signal is output from the first electrode and the second electrode when pressure i s applied.

The first electrode of the semiconductor substrate is electrically connected to the partition portion of the housing, a lead member which is electrically independent of the housing is accommodated at the back surface side of the semiconductor substrate in the housing, and the lead member and the second electrode of the semiconductor substrate are electrically connected to each other.

According to the pressure detecting device of the twelfth aspect, the semiconductor substrate is equipped with the electrodes on both the front and back surfaces thereof, and the partition portion and the lead member are arranged so that both the front and back surfaces of the semiconductor substrate are sandwiched by the partition portion and the lead member. Therefore, no wire bonding is required for lead-out of the electrodes on both the front and back surfaces of the semiconductor substrate. Accordingly, the size (diameter) of the housing can be reduced.

Furthermore, even when the measurement environment is set to high temperature, heat can be prevented from being transferred from the measurement environment to the semiconductor substrate because the second portion of the housing located at the measurement environment side has lower thermal conductivity than the first portion.

Therefore, according to the present invention, there can be provided a pressure detecting device in which the increase of the temperature of the semiconductor substrate can be suppressed with reducing the size of the housing.

Here, according to a thirteenth aspect of the present invention, the first portion of the housing is formed of metal, and the second portion is formed of ceramic material.

Furthermore, according to a fourteenth aspect of the present invention, it is preferable that the pressure transmitting member has a smaller thermal conductivity than the first portion of the housing. In this case, suppressing the heat transfer from the measurement environment to the semiconductor substrate can be greatly improved.

In this case, according to a fifteenth aspect of the present invention, the pressure transmitting member may be formed of the same material as the second portion of the housing.

BRIEF DESCRIPTION OF THE DRAWINGS

The above and other objects, features and advantages of the present invention will become more apparent from the following detailed description made with reference to the accompanying drawings. In the drawings.

DESCRIPTION OF THE PREFERRED EMBODIMENTS

Figure 1:
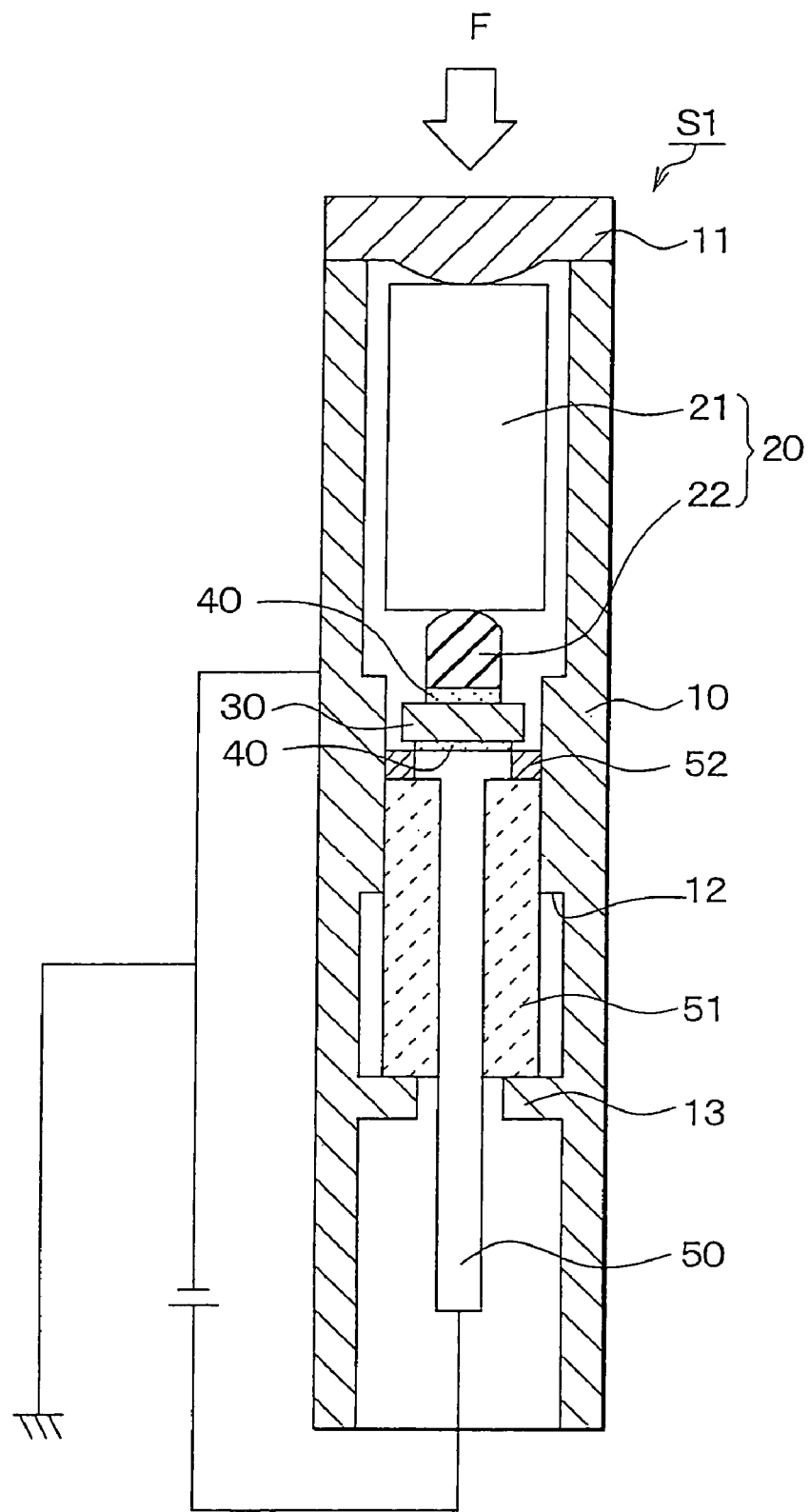
FIG. 1 is a longitudinally-sectional view showing the overall construction of a pressure detection device according to a first embodiment of a pressure detecting device.

Preferred embodiments according to the present invention will be described hereunder with reference to the accompanying drawings. In the following embodiments, the same elements are represented by the same reference numerals.

First Embodiment

FIG. 1 is a longitudinally-sectional view showing the overall construction of a pressure detecting device S1 according to a first embodiment of this invention. The pressure detecting device S1 may be applied, for example, as a combustion pressure sensor for detecting the combustion pressure in a combustion chamber of an engine.

A housing 10 is designed in a substantially cylindrical shape as a whole, and formed of metal such as stainless steel or the like. A diaphragm 11, which is distorted by application of pressure F, is equipped at the upper end of the housing 10. The diaphragm 11 is formed of metal such as stainless steel or the like, and bonded to the housing 10 by welding, adhesion or the like.

A pressure transmitting member 20 for transmitting the pressure F to the semiconductor substrate 30 is equipped in the housing 10. The pressure transmitting member 20 comprises a cylindrical rod 21 located at the side of the diaphragm 11 and an interposed member 22 located in contact with the rod 21 and the semiconductor substrate 30. The rod 21 and the interposed member 22 may also be formed of a metal such as stainless steel or the like.

The semiconductor substrate 30 is accommodated at a lower side of the housing 10 than the pressure transmitting member 20 in the housing 10. Here, in the following description, the front surface of the semiconductor substrate 30 means the top surface of the semiconductor substrate 30 as shown in FIG. 1, that is, a surface of the semiconductor substrate 30 located at the side of the pressure transmitting member 20. The back surface of the semiconductor substrate 30 means the lower surface of the semiconductor substrate 30 which is opposite to the front surface. Furthermore, a direction along which the front surface and the back surface are spaced from each other, that is, the vertical direction in FIG. 1 will be hereinafter referred to as "spacing direction". The semiconductor substrate 30 outputs an electrical signal in accordance with the pressure applied in the spacing direction, that is, in the thickness direction of the semiconductor substrate 30.

The front surface of the semiconductor substrate 30 is brought into contact with the pressure transmitting member 20 so that the pressure from the pressure transmitting member 20 is transmitted to the front surface of the semiconductor substrate 30. In this embodiment, the interposed member 22 of the pressure transmitting member 20 and the front surface of the semiconductor substrate 30 are bonded to each other through conductive adhesive material 40 such as silver paste or the like.

A lead member 50 which is electrically independent of the housing 10 is accommodated at the back surface side of the semiconductor substrate 30 inside of the housing 10. The lead member 50 is designed as a metal rod, and comprises a gold-plated base member of Ni—Cu—Co type alloy.

The lead member 50 is inserted and held in a cylindrical lead holder 51 formed of a ceramic material such as electrically insulating alumina or the like. The gap between the lead holder 51 and the lead member 50 is sealed by hermetic glass or the like.

An end portion of the lead member 50 at the side of the semiconductor substrate 30 is projected from the lead holder 51, and brought into contact with the back surface of the semiconductor substrate 30 so as to be electrically connected to the back surface of the semiconductor substrate 30. In this embodiment, the lead member 50 and the back surface of the semiconductor substrate 30 are bonded to each other through conductive adhesive material 40 such as silver paste or the like.

An electrically insulating ring 52 formed of ceramic material is disposed on the outer periphery of the end portion of the lead member 50 and brought into contact with the back surface of the semiconductor substrate 30. The other end portion of the lead member 50, which is located at the opposite side to the semiconductor substrate 30, is projected from the lead holder 51 so that the lead member 50 can be connected to an external wiring member (not shown) or generally externally connected.

Here, the lead holder 51 is supported by projecting portions 12, 13 equipped on the inner surface of the housing 10 so that it is substantially prevented from displacing in the longitudinal and lateral directions.

In the pressure detecting device S1, the pressure F received by the diaphragm 11 is transmitted from the pressure transmitting member 20 located at the front surface side of the semiconductor substrate 30 to the front surface of the semiconductor substrate 30. Here, the pressure F is applied to the semiconductor substrate 30 in the spacing direction of the front and back surfaces of the semiconductor substrate 30, and the electrical signal output from the semiconductor substrate 30 is varied in accordance with the variation of the pressure F. The detailed construction of the semiconductor substrate 30 of this embodiment will be described with reference to FIGS. 2 and 3.

Figure 2:
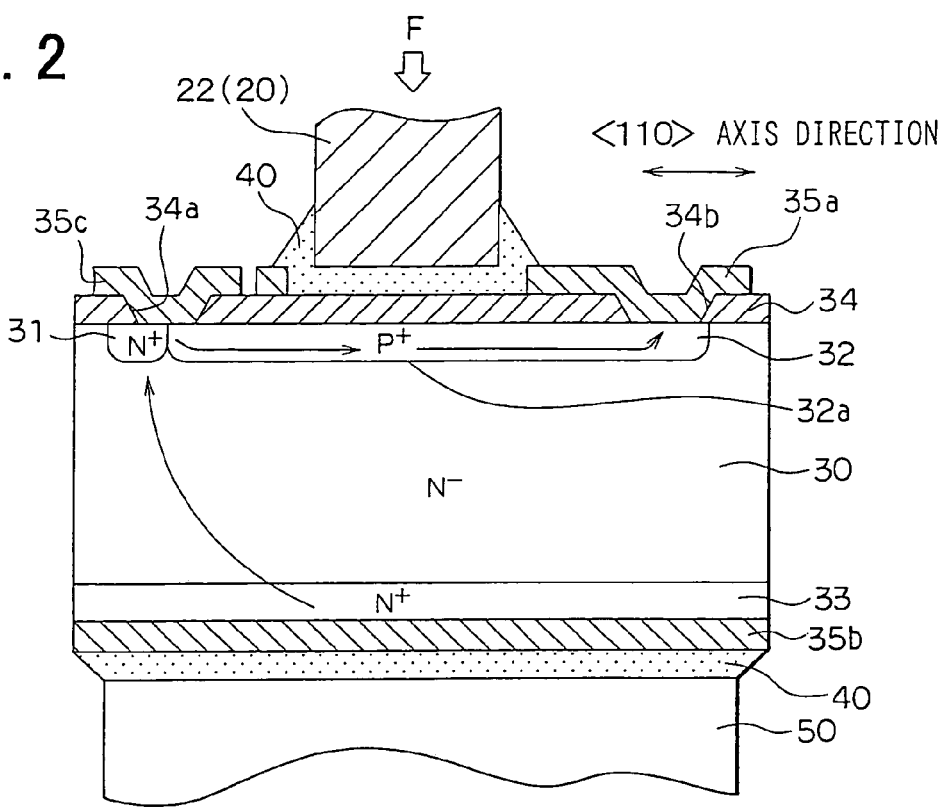
FIG. 2 is an enlarged view of the semiconductor substrate of FIG. 1 and its immediate vicinity.
Figure 3:
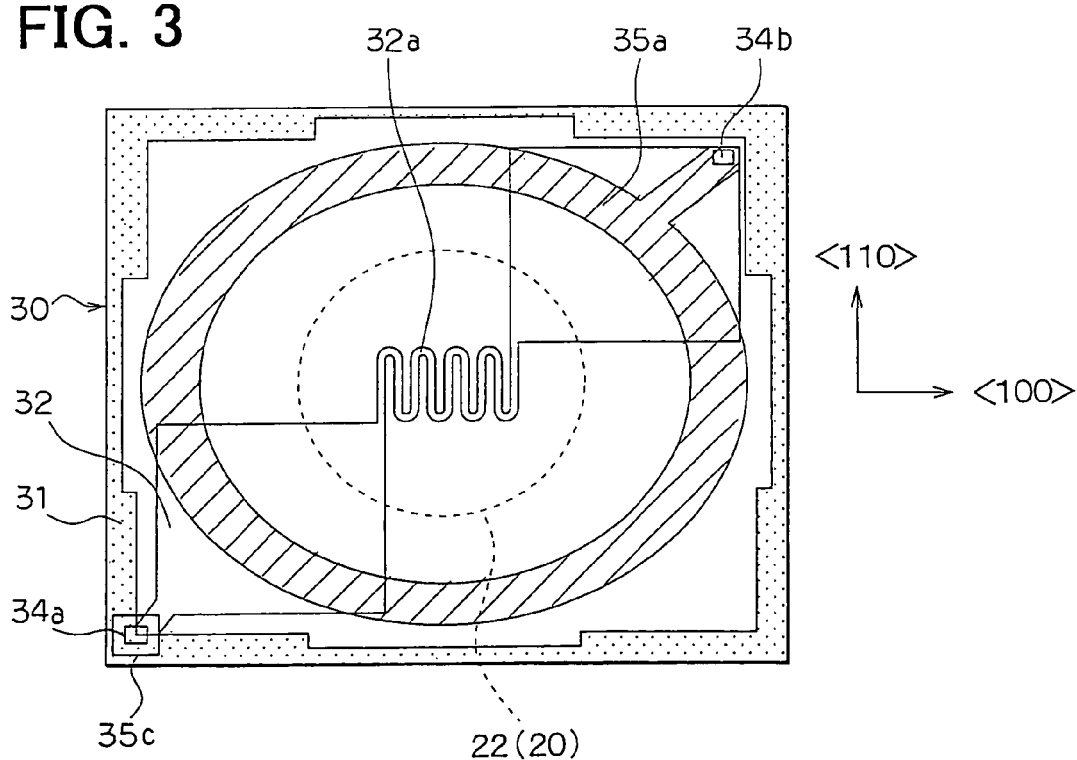
FIG. 3 is a plan view the front surface side of the semiconductor substrate of FIG. 1.

FIG. 2 is an enlarged view showing the immediate vicinity of the semiconductor substrate 30 of FIG. 1, and FIG. 3 is a plan view showing the construction of each part at the front surface side of the semiconductor substrate 30. In FIG. 3, for ease of illustration and identification of the respective parts, the first N-type diffusion layer 31 is shown as being dotted, and the first electrode 35a is shown as being hatched.

The semiconductor substrate 30 of this embodiment is an N-type silicon substrate 30 whose rectangular plane direction corresponds to a (110)-plane. Also, the <110> crystal axis exists on the planes of the front and back surfaces of the N-type silicon substrate 30.

As shown in FIGS. 2 and 3, the pressure F from the interposed member 22 of the pressure transmitting member 20 is transmitted to the center portion of the front surface of the N-type silicon substrate 30.

The first N-type diffusion layer 31 is equipped at the peripheral portion on the front surface of the N-type silicon substrate 30. The first N-type diffusion layer 31 is formed by doping or diffusing impurities such as phosphorous or the like. In this case, the first N-type diffusion layer 31 is formed in a ring shape at the peripheral portion of the N-type silicon substrate 30.

Furthermore, a P-type diffusion gage layer 32 is continuously formed on the front surface of the N-type silicon substrate 30 so as to extend from a neighboring portion of the first N-type diffusion layer 31 through the center portion of the N-type silicon substrate 30 to the other peripheral portion. In the following description, the end portion of the P-type diffusion gage layer 32 will be hereinafter referred to as "one end portion" of the first N-type diffusion layer 31 side. The end portion of the P-type diffusion gage layer 32 at the other peripheral side will be hereinafter referred to as "the other end portion".

In this case, as shown in FIG. 3, the P-type diffusion gage layer 32 is continuously formed from the one end portion of the rectangular N-type silicon substrate 30 to the other end portion thereof. The P-type diffusion gage layer 32 is formed by doping or diffusing impurities such as boron or the like.

As shown in FIG. 3, the P-type diffusion gage layer 32 is designed to have turnover (U-shaped) portions at the center potion of the front surface of the N-type silicon substrate 30 (i.e., the P-type diffusion gage layer 32 is designed in a meandering form). This meandering portion is constructed as a gage portion 32a. The longitudinal portion of each turnover portion of the meandering gage portion 32a is equipped along the <110> crystal axis direction of the N-type silicon substrate 30.

As described above, the P-type diffusion gage layer 32 has such a shape that the longitudinal direction of the resistance is along the <110> crystal axis direction of the N-type silicon substrate 30 at the center portion of the front surface of the N-type silicon substrate 30.

Furthermore, a second N-type diffusion layer 33 is equipped on the back surface of the N-type silicon substrate 30 as shown in FIG. 2. The second N-type diffusion layer 33 is formed by doping or diffusing impurities such as phosphorous or the like. In this case, the second N-type diffusion layer 33 is formed substantially over the entire surface area of the back surface of the N-type silicon substrate 30.

As shown in FIG. 2, a silicon oxide film 34 is further formed as insulating film on the front surface of the N-type silicon substrate 30 by thermal oxidation or the like so as to cover the front surface of the N-type silicon substrate 30. Furthermore, a first electrode 35a and a third electrode 35c are formed on the silicon oxide film 34 at the front surface side of the N-type silicon substrate 30, and a second electrode 35b is formed at the back surface side of the N-type silicon substrate 30.

These first to third electrodes 35a to 35c are formed of aluminum or the like by sputtering, vapor deposition or the like, and they are constructed as ohmic electrodes connected to the respective diffusion layers 31, 32, 33 of the N-type silicon substrate 30 through ohmic contact.

In this case, the first electrode 35a is disposed at the peripheral portion on the front surface of the N-type silicon substrate 30, and in the example shown in FIG. 3, the first electrode 35a is formed in a ring shape so as to surround the interposed member 22 of the pressure transmitting member 20 located at the center portion. More particularly, the first electrode 35a is located at the peripheral portion excluding the gage portion 32a of the P-type diffusion gage layer 32 which is located at the center portion of the N-type silicon substrate 30. In this embodiment, the first electrode 35a is designed to have a ring shape that surrounds the gage portion 32a. The first electrode 35a and the interposed member 22 of the pressure transmitting member 20 are electrically connected to each other through the conductive adhesive material 40.

As shown in FIGS. 2 and 3, at the front surface side of the N-type silicon substrate 30, a (first) contact hole 34a is formed in the silicon oxide film 34 at the position corresponding to the first N-type diffusion layer 31 and the one end portion of the P-type diffusion gage layer 32 which is adjacent to the first N-type diffusion layer 31. The third electrode 35c is electrically connected to the first N-type diffusion layer 31 and the one end portion of the P-type diffusion gage layer 32 through the contact hole 34a under ohmic contact.

Furthermore, a (second) contact hole 34b is formed in the silicon oxide film 34 at the position corresponding to the other end portion of the P-type diffusion gage layer 32 at the opposite side to the first N-type diffusion layer 31. The first electrode 35a and the other end portion of the P-type diffusion gage layer 32 are electrically connected to each other through the contact hole 34b under ohmic contact.

The second electrode 35b is formed substantially over the entire surface area of the back surface side of the N-type silicon substrate 30. The second electrode 35b and the second N-type diffusion layer 33 are electrically connected to each other at the back surface side under ohmic contact. The second electrode 35b is bonded and electrically connected to the lead member 50 through the conductive adhesive material 40.

As described above, the N-type silicon substrate 30 includes the diffusion layers 31, 32, 33, the silicon oxide film 34, the first electrode 35a and the third electrode 35c, all of which are formed on the front surface of the substrate 30. The substrate 30 also includes the second electrode 35b, which is formed on the back surface. These elements can be manufactured by well-known semiconductor manufacturing techniques.

According to the construction using the semiconductor substrate 30 comprising the N-type silicon substrate 30 whose plane direction corresponds to the (110) plane as shown in FIGS. 2 and 3, the pressure detection can be performed as follows.

In the N-type silicon substrate 30 as described above, a voltage is applied to the N-type silicon substrate 31 through the pressure transmitting member 20 and the lead member 50 so that the second electrode 35b is set to a positive potential and the first electrode 35a is set to a negative potential. This will be referred to as a voltage applied state.

Here, in this embodiment, the housing 10, the diaphragm 11 and the pressure transmitting member 20 are all formed of metal and thus have electrical conducting properties and are mutually electrically conducted to one another. Therefore, the first electrode 35a is electrically connected to the housing 10 through the pressure transmitting member 20, so that it can be electrically connected to the external.

Therefore, the voltage applied state described above can be implemented by bonding an external wiring member such as a connector or the like to one end (the lower end in FIG. 1) of the housing 10 in FIG. 1 and setting the lead member 50 and the housing 10 to a positive potential and GND potential, respectively.

Under this voltage applied state, current flows as indicated by an arrow of FIG. 2. More particularly, current flows from the second electrode 35b through the second N-type diffusion layer 33, the inside of the N-type silicon substrate 30 and the third electrode 35c. The current further flows from the one end portion of the P-type diffusion gate layer 32 through the gage portion 32a and the other end portion of the P-type diffusion gage layer 32 to the first electrode 35a in this order. At this time, in the P-type diffusion gage layer 32, current flows mainly along the (110) crystal axis direction.

When the pressure F received by the diaphragm 11 is transmitted through the pressure transmitting member 20 to the front surface of the N-type silicon substrate 30 under the above state, the pressure is applied to the N-type silicon substrate 30 in the spacing direction of both the front and back surfaces and distortion occurs in the N-type silicon substrate 30. At this time, the resistance value along the (110) crystal axis direction in the P-type diffusion gage layer 32 is varied in connection with the distortion of the N-type silicon substrate 30. Therefore, the pressure detecting can be performed by outputting the variation of the resistance value caused by pressure application, that is, the variation of current or voltage as an electrical signal from both the first and second electrodes.

As described above, according to this embodiment, with respect to the semiconductor substrate 30 for outputting an electrical signal in accordance with the pressure applied in the spacing direction of the front and back surfaces thereof, the first electrode 35a is formed on the front surface thereof while the second electrode 35b is formed on the back surface thereof, and the electrical signal is output from the first and second electrodes 35a and 35b.

In the pressure detecting device S1 of this embodiment, the semiconductor substrate 30 is equipped with the electrodes 35a, 35b on the front and back surfaces thereof, respectively, and both the front and back surfaces of the semiconductor substrate 30 are sandwiched by the conductive pressure transmitting member 20 and the conductive lead member 50. Therefore, no wire bonding is required for the lead-out of the electrodes 35a, 35b on the front and back surfaces of the semiconductor substrate 30.

Therefore, this embodiment eliminates the need to dispose a lead member for wire bonding on the outer periphery of the semiconductor substrate 30 as in the case of the conventional semiconductor sensor, and thus the diameter of the housing 10 can be reduced to a size nearer to the size of the semiconductor substrate 30. As described above, according to this embodiment, there can be provided the pressure detecting device having a construction suitable to reduce the diameter (size) of the housing 10.

Furthermore, according to this embodiment, the pressure transmitting member 20 (the interposed member 22 in this embodiment) is disposed to face the center portion of the front surface of the semiconductor substrate 30 so that the pressure from the pressure transmitting member 20 is transmitted to the center portion of the front surface concerned.

Still furthermore, on the front surface of the semiconductor substrate 30, the first electrode 35a is disposed to be nearer to the peripheral portion side on the front surface than the pressure transmitting member 20, and the interposed member 22 of the pressure transmitting member 20 and the first electrode 35a are electrically connected to each other through the conductive adhesive material 40.

According to the construction described above, the pressure from the pressure transmitting member 20 is directly applied to the front surface of the semiconductor substrate 30 without passing through the first electrode 35a, so that transmission loss of the pressure by the first electrode 35a equipped on the front surface of the semiconductor substrate 30 is suppressed to a minimum.

The first electrode 35a is formed of metal such as aluminum or the like that is normally softer than the semiconductor substrate 30. Therefore, it is preferable that the pressure is transmitted to the semiconductor substrate 30 without passing through the first electrode 35a.

If the first electrode 35a is designed in a ring shape as shown in FIG. 3, the interposed member 22 of the pressure transmitting member 20 equipped at the center portion on the front surface of the semiconductor substrate 30 is preferably designed so as to surround the first electrode 35a. Therefore, the first electrode 35a can be connected to any side surface of the interposed member 22 of the pressure transmitting member 20 through the conductive adhesive material 40.

Furthermore, in this embodiment, the N-type silicon substrate 30 shown in FIGS. 2 and 3 is used as the semiconductor substrate 30. Particularly, the P-type diffusion gage layer 32 is designed in such a shape that the longitudinal direction of the resistance at the center portion on the front surface of the N-type silicon substrate 30 is along the <110> crystal axis direction, that is, it has the gage portion 32a.

According to this construction, the variation of the resistance value in the <110> crystal axis direction in the P-type diffusion gage layer 32 can be intensified at the center portion on the front surface of the N-type silicon substrate 30 to which the pressure from the pressure transmitting member 20 is applied, and thus the pressure detection can be performed with high precision.

Still furthermore, according to this embodiment, the first electrode 35a is electrically connected to the housing 10 having the electrically conductive properties through the pressure transmitting member 20, thereby enabling the electrical connection between the first electrode 35a and an external device, or generally an external connection of the first electrode 35a. Accordingly, the housing 10 can be used as a terminal, and the electrical connection construction of the pressure detecting device can be simplified.

Here, a conductive layer (not shown) having electrical resistance lower than the pressure transmitting member 20 and the housing 10 may be formed in the pressure transmitting member and the housing 10. For example, by plating gold on the outer surface of the pressure transmitting member 20 or the inner surface of the housing 10, the gold-plated layer thus formed serves as a conductive layer having more excellent electrically conductive properties as compared with both the members 10, 20 formed of stainless steel or the like.

By forming such a conductive layer, the electrical resistance in the current path extending from the first electrode 35a through the pressure transmitting member 20 and the housing 10 to the external can be reduced, and this is preferable.

Next, a modification of the above embodiment will be described. In the embodiment shown in FIGS. 2 and 3, the first electrode 35a is disposed at the peripheral portion of the pressure transmitting member 20 located at the center portion on the front surface of the semiconductor substrate 30, whereby the pressure from the pressure transmitting member 20 is transmitted to the center portion on the front surface of the semiconductor substrate 30. More particularly, the pressure is transmitted to the gage portion 32a without passing through the first electrode 35a.

Figure 4:
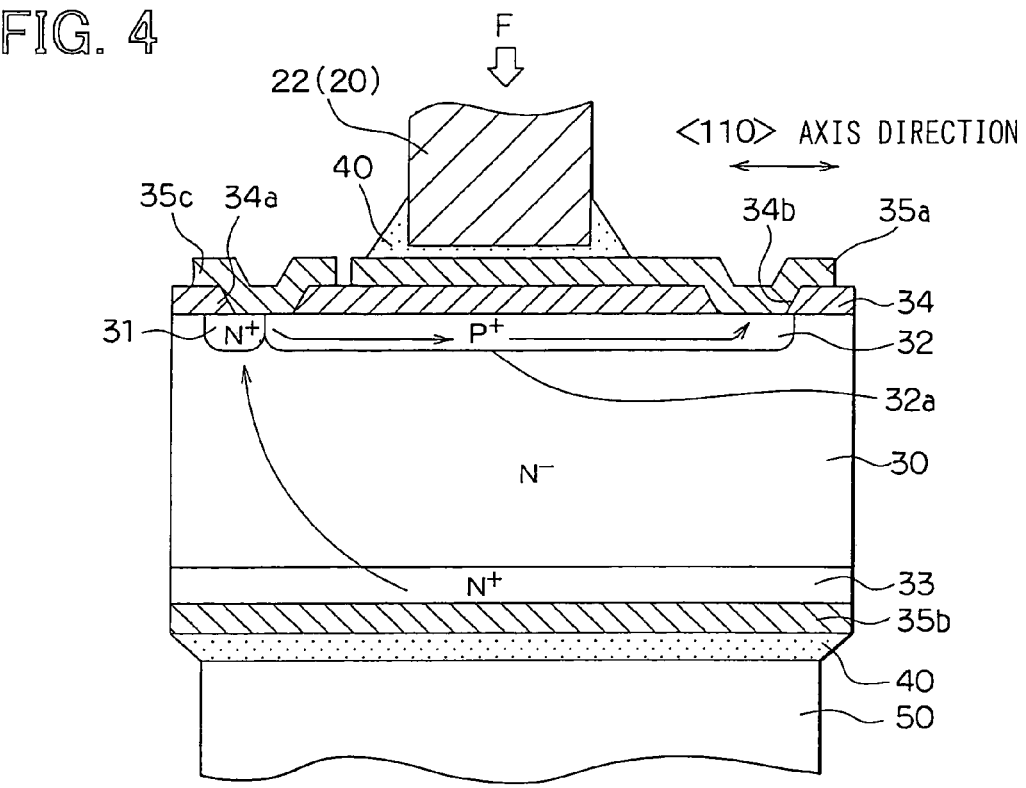
FIG. 4 is an enlarged view of the semiconductor substrate and its immediate vicinity according to a modification to the first embodiment.
Figure 5:
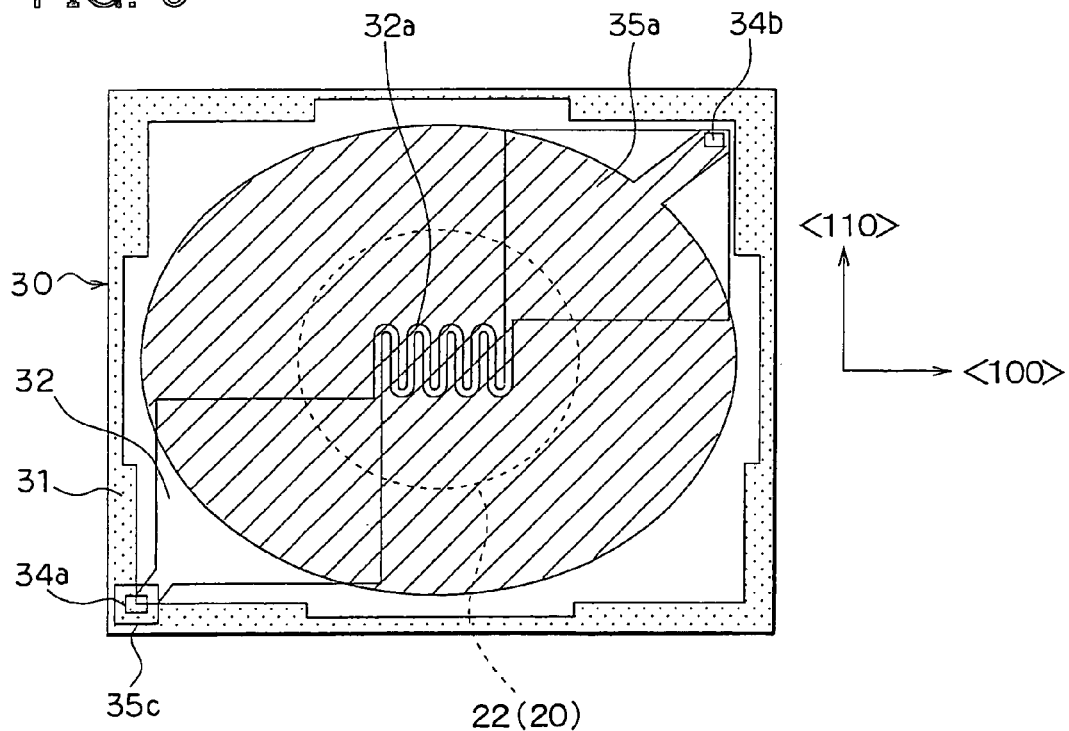
FIG. 5 is a plan view showing the construction of each part at the front surface side of the semiconductor substrate according to the modification to the first embodiment.

However, the pressure detecting device may be modified so that the pressure from the pressure transmitting member 20 can be transmitted through the first electrode 35a to the center portion on the front surface of the semiconductor substrate 30, that is, the gage portion 32a, as shown in FIGS. 4 and 5.

FIG. 4 is an enlarged view of the immediate vicinity of the semiconductor substrate 30 in the modification of the above embodiment, and FIG. 5 is a plan view showing the construction of each part at the front surface side of the semiconductor 30 of the modification.

In this modification, the inner portion of the ring-shaped first electrode 35a in the construction shown in FIGS. 2 and 3 is embedded. That is, the first electrode 35a is continuously formed from the center portion to the peripheral portion on the front surface of the semiconductor substrate 30, and the planar shape thereof is substantially circular in the illustration.

In this case, the first electrode 35a and the interposed member 22 of the pressure transmitting member 20 may be brought into direct contact with each other if they can be electrically connected to each other. However, it is normally preferable to electrically connect them through conductive adhesive material 40 as shown in FIG. 4.

(Second Embodiment)

As compared with the first embodiment, the semiconductor substrate of a second embodiment is modified. In the following description, the difference from the first embodiment will be mainly described.

Figure 6:
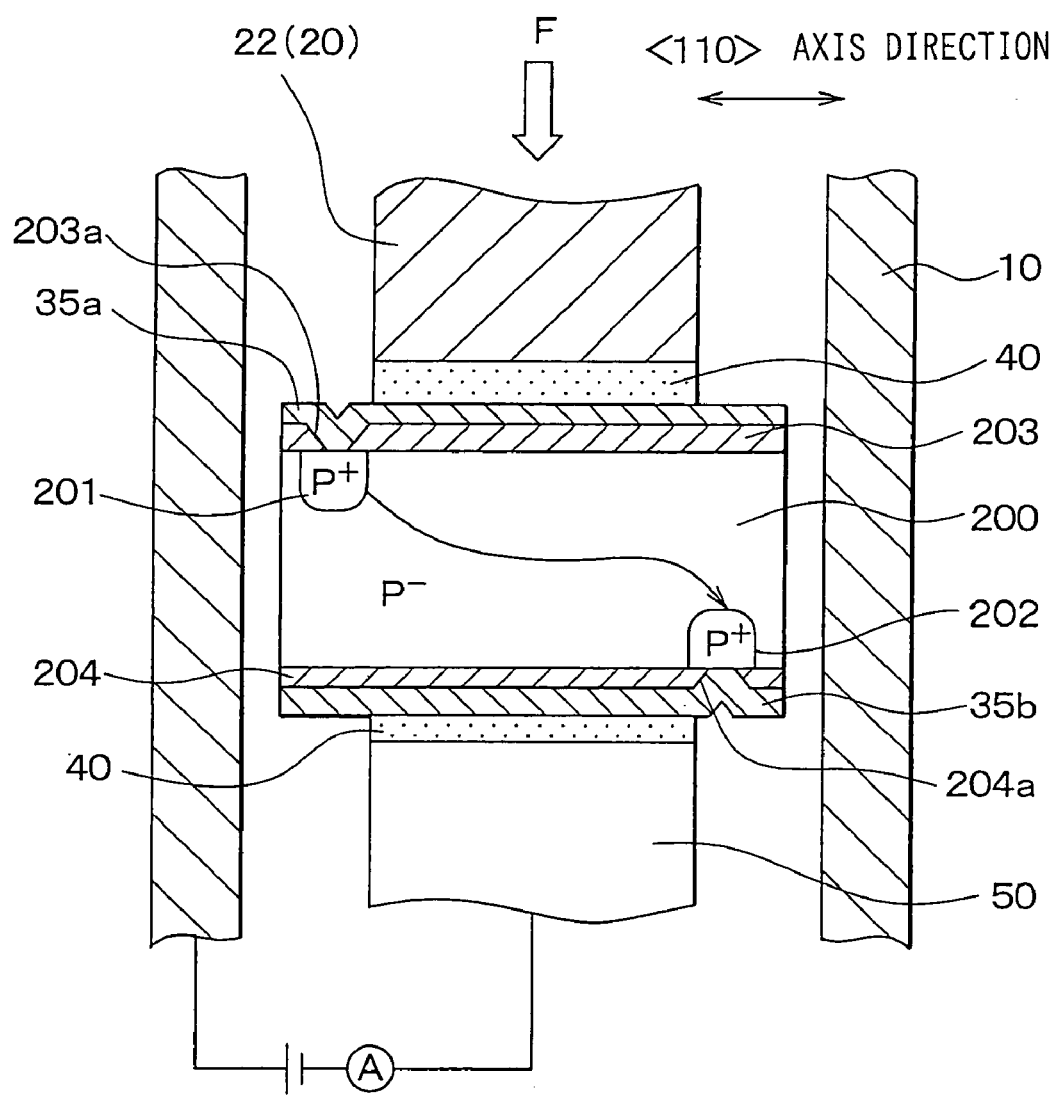
FIG. 6 is a cross-sectional view showing the semiconductor substrate and its vicinity according to a second embodiment of the pressure detecting device.

FIG. 6 shows the main part of the pressure detecting device according to the second embodiment of this invention, and specifically it is a cross-sectional view showing the semiconductor substrate 200 and its immediate vicinity. In FIG. 6, the ring 52 surrounding the lead member 50 is omitted for ease of illustration.

Figure 7A:
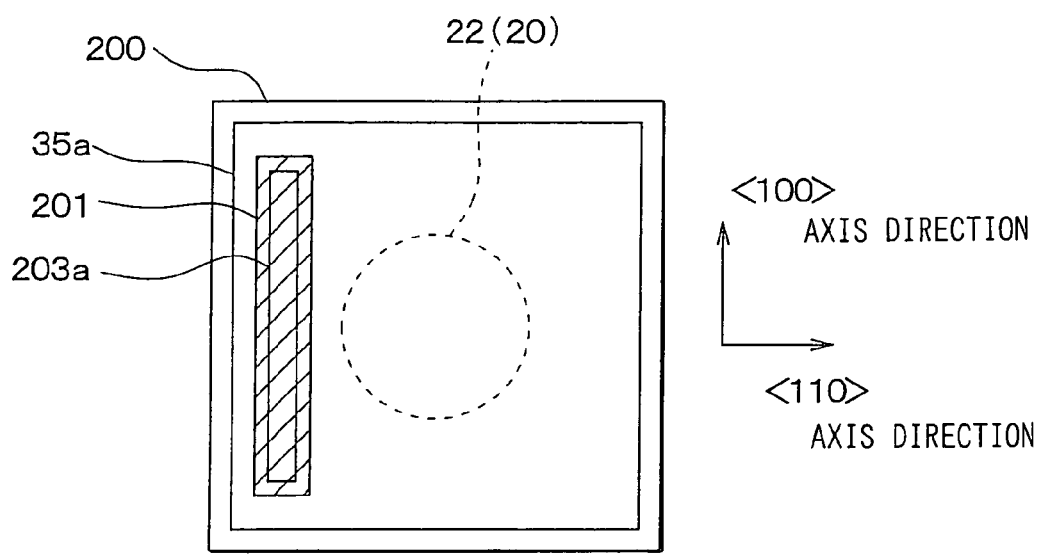
FIG. 7A is a plan view of the front surface side of the semiconductor substrate shown in FIG. 6.
Figure 7B:
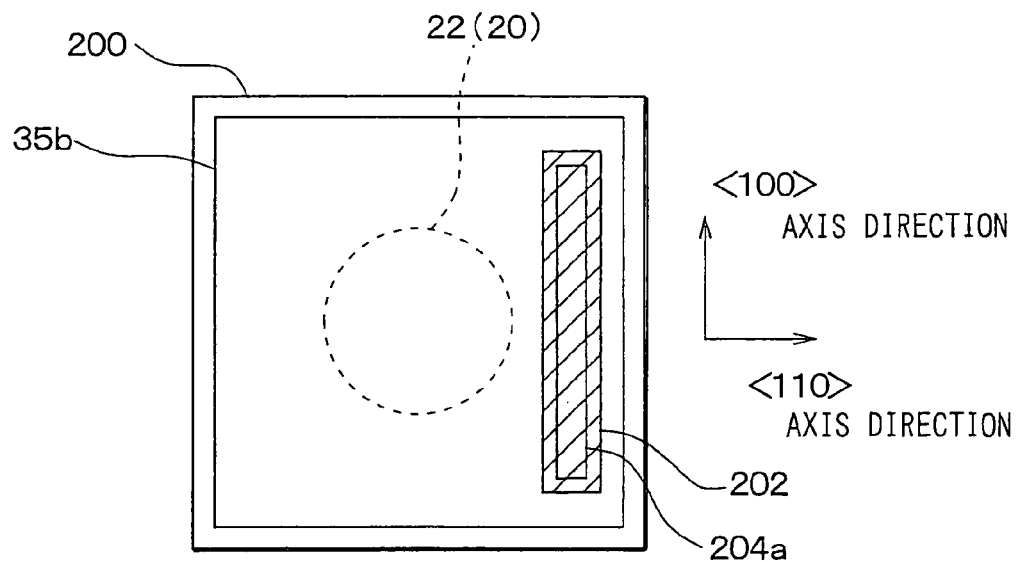
FIG. 7B is a plan view of the back surface side of the semiconductor substrate shown in FIG. 6.

FIG. 7A is a plan view showing the construction of each part at the front surface side of the semiconductor substrate 200, and FIG. 7B is a plan view showing the construction of each part at the back surface side of the semiconductor substrate 200. In FIGS. 7A and 7B, the diffusion layers 201, 202 are hatched for ease of illustration and identification of the respective elements.

In this embodiment, a P-type silicon substrate 200 whose plane direction corresponds to the (110)-plane is used as the semiconductor substrate of the pressure detecting device S1. The P-type silicon substrate 200 is also designed so that the pressure F from the pressure transmitting member 20 is transmitted to the center portion of the front surface thereof.

As shown in FIGS. 6 and 7, a first P-type diffusion layer 201 is equipped at a peripheral portion on the front surface of the P-type silicon substrate 200. The first P-type diffusion layer 201 is formed by doping or diffusing impurities such as boron or the like.

Furthermore, a second P-type diffusion layer 202 is equipped on the back surface of the P-type silicon substrate 200 at the other peripheral portion opposite to the (110) crystal axis directions interposing the center portion from the peripheral portion of the P-type silicon substrate 200 in which the first P-type diffusion layer 201 is positioned. The second P-type diffusion layer 202 is also formed by doping or diffusing impurities such as boron or the like.

According to this embodiment, (as shown in FIG. 7A and 7B) in the rectangular P-type silicon substrate 200, the (110) crystal axis direction is coincident to the direction in which two confronting sides of the substrate 200 are spaced from each other. Therefore, the first P-type diffusion layer 201 is disposed at the peripheral portion of the left side of the P-type silicon substrate 200 and the second P-type diffusion layer 202 is disposed at the peripheral portion of the right side of the second P-type diffusion layer in FIGS. 7A and 7B.

Furthermore, as shown in FIG. 6, silicon oxide film 203, 204 is formed as insulating film on the front and back surface sides of the P-type silicon substrate 200 by thermal oxidation or the like so as to cover the front and back surface of the P-type silicon substrate 200, respectively.

Furthermore, the first electrode 35a is formed so as to cover the silicon oxide film 203 at the front surface side of the P-type silicon substrate 200, and the second electrode 35b is formed so as to cover the silicon oxide film 204 at the back surface side of the P-type silicon substrate 200.

In this case, the first electrode 35a and the second electrode 35b are formed on substantially the entire surface area of the front and rears surfaces of the P-type silicon substrate 200. Furthermore, as shown in FIG. 6, the first electrode 35a is bonded and electrically connected to the pressure transmitting member 20 through the conductive adhesive material 40, and the second electrode 35b is electrically connected to the lead member 50 through the conductive adhesive material 40.

This embodiment may be modified so that the first electrode 35a is disposed at the peripheral portion of the pressure transmitting member 20 located at the center portion on the front surface of the P-type silicon substrate 200, and the first electrode 35a and the pressure transmitting member 20 are electrically connected to each other by the conductive adhesive material 40. In this case, for example, as shown in FIG. 7A the pressure transmitting member 20 is detached, and the first electrode 35a is formed at the left side of the substrate 200.

Furthermore, a contact hole 203a is formed at the position corresponding to the first P-type diffusion layer 201 in the silicon oxide film 203 at the surface side of the P-type silicon substrate 200. The first electrode 35a and the first P-type diffusion layer 201 are electrically connected to each other through the contact hole 203a under ohmic contact.

In addition, a contact hole 204a is formed at the position corresponding to the second P-type diffusion layer 202 in the silicon oxide film 204 at the back surface side of the P-type silicon substrate 200. The second electrode 35b and the second P-type diffusion layer 202 are electrically connected to each other through the contact hole 204a under ohmic contact.

As described above, the P-type silicon substrate 200 has the respective diffusion layers 201, 202, the silicon oxide film 203 and the first electrode 35a formed on the front surface of the substrate 200, and the silicon oxide film 204 and the second electrode 35b formed on the back surface of the substrate 200. These elements may be manufactured by using well-known semiconductor manufacturing techniques.

According to the construction using the semiconductor substrate 200 comprising the P-type silicon substrate 200 whose plane direction corresponds to the (110)-plane as shown in FIGS. 6 and 7A, 7B, the pressure detection can be performed as follows.

The potential relationship (positive potential and negative potential) between the first electrode 35a and the second electrode 35b is not limited to a specific pattern. That is, each of the first electrode 35a and the second electrode 35b may be set to positive or negative. In this embodiment, it is assumed that a voltage is applied to the semiconductor substrate, that is, the P-type silicon substrate 200 through the pressure transmitting member 20 and the lead member 50 so that the first electrode 35a is set to a positive potential and the second electrode 35b is set to a negative potential for discussion only.

In the first embodiment the voltage applied state is implemented by bonding one end (lower end in FIG. 1) of the housing 10 of FIG. 1 to an external wiring member such as a connector or the like and setting the lead member 50 to a negative potential (or GND) while the housing 10 is set to a positive potential. In this embodiment, in the voltage applied state, current flows as indicated by an arrow of FIG. 6. That is, the current flows from the first P-type diffusion layer 201 through the inside of the P-type silicon substrate 200 to the second P-type diffusion layer 202 mainly in the <110> crystal axis direction.

When the pressure F is applied to the P-type silicon substrate 200 in the spacing direction of both the front and back surfaces thereof and thus the P-type silicon substrate 200 is distorted in the thickness direction thereof, the resistance value along the <110> crystal axis direction of the P-type silicon substrate 200 is varied. Therefore, the current or voltage variation caused by the voltage application is outputted as an electrical signal from both the first and second electrodes 35a and 35b, whereby the pressure detection can be performed.

In the pressure detecting device of this embodiment, by designing the semiconductor substrate 200 so that the electrodes 35a, 35b are equipped on the front and back surfaces of the semiconductor substrate 200 and the front and back surfaces are sandwiched between the conductive pressure transmitting member 20 and the lead member 50, no wire bonding is required for lead-out of the electrodes 35a, 35b on the front and back surfaces of the semiconductor substrate 200.

Therefore, it is unnecessary to dispose the lead member for wire bonding on the outer periphery of the semiconductor substrate 200, so that the diameter (size) of the housing 10 can be reduced to a size near to the size of the semiconductor substrate 200. As described above, according to this embodiment, there can be provided a pressure detecting device having a construction suitable to reduce the size of the housing 10.

Here, a modification of the above embodiment will be described. In the embodiment shown in FIGS. 6, 7A and 7B, in the rectangular P-type silicon substrate 200, the <110> crystal axis direction is coincident with the direction in which two confronting sides of the substrate 200 are spaced from each other. Therefore, the first P-type diffusion layer 201 and the second P-type diffusion layer 202 are located at the confronting one and other sides of the rectangular P-type silicon substrate 200 in the planar positional relationship.

Figure 8:
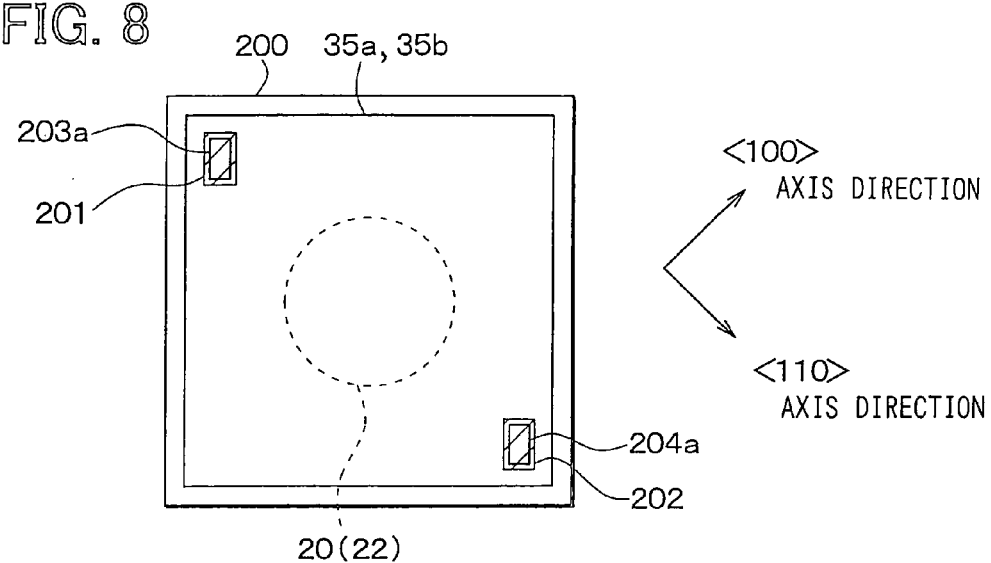
FIG. 8 is an illustration of the planar arrangement relationship of the respective parts of the semiconductor substrate of a modification to the second embodiment.

Here, FIG. 8 shows the planar positional relationship of the respective parts of the semiconductor substrate according to the modification of the above embodiment. In the modification shown in FIG. 8, in the rectangular P-type silicon substrate 200 the <110> crystal axis direction is along the diagonal direction of the P-type silicon substrate 200.

In the P-type silicon substrate 200 as described above, the first P-type diffusion layer 201 and the second P-type diffusion layer 202 confront each other along the diagonal direction of the P-type silicon substrate 200. More particularly, both the P-type diffusion layers 201, 202 are located at the confronting corner portions of the P-type silicon substrate 200.

According to this construction, the distance between the first P-type diffusion layer 201 and the second P-type diffusion layer 202 can be increased in the rectangular P-type silicon substrate 200. That is, the current path along the<110>crystal axis direction can be lengthened. Accordingly, the variation of the resistance value can be intensified, and the detection sensitivity can be enhanced.

(Third Embodiment)

In a third embodiment of this invention, the semiconductor substrate of the above embodiment is modified. In the following description, the difference from the above embodiment will be mainly described.

Figure 9:
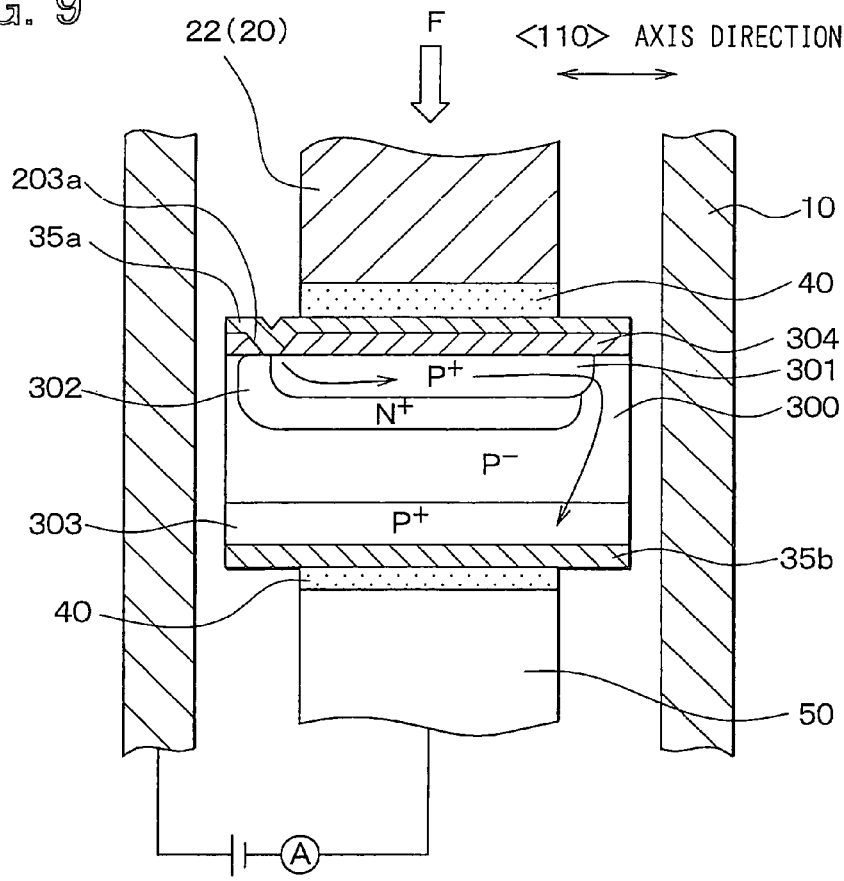
FIG. 9 is a cross-sectional view showing the semiconductor substrate and its immediate vicinity according to a third embodiment of the pressure detecting device.

FIG. 9 is a diagram showing the main part of a pressure detecting device according to the third embodiment, and specifically FIG. 9 is a cross-sectional view showing the semiconductor substrate 300 and its immediate vicinity. In FIG. 9, the ring 52 surrounding the lead member 50 is omitted for ease of illustration.

Figure 10:
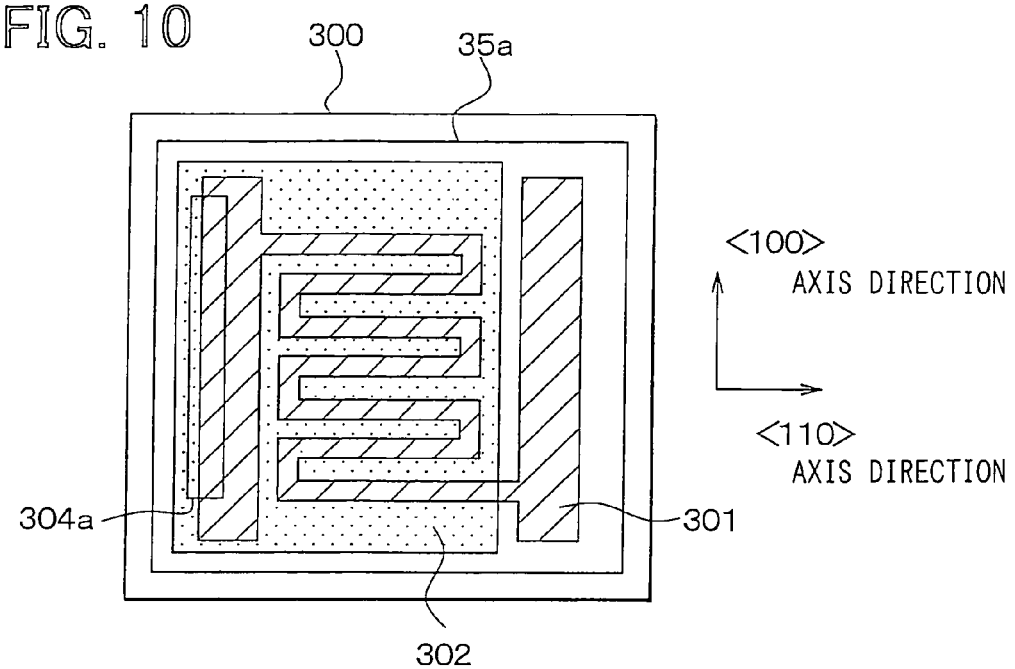
FIG. 10 is a plan view of the semiconductor substrate shown in FIG. 9.

FIG. 10 is a plan view showing the construction of each part at the front surface side of the semiconductor substrate 300. In FIG. 10, a P-type diffusion gage layer 301 is shown as being hatched and an N-type diffusion layer 302 is shown as being dotted in order to make it easy to identify the respective parts.

In this embodiment, a P-type silicon substrate 300 whose plane direction corresponds to the(110)-plane is used as the semiconductor in the pressure detecting device S1. The P-type silicon substrate 300 is also designed so that the pressure from the pressure transmitting member 20 is transmitted to the center portion on the front surface of the P-type silicon substrate 300.

As shown in FIGS. 9 and 10, the P-type diffusion gage layer 301 is equipped on the front surface of the P-type silicon substrate 300. The P-type diffusion gage layer 301 is formed by doping or diffusing impurities such as boron or the like.

The P-type diffusion gage layer 301 has such a shape as to extend from one peripheral portion of the P-type silicon substrate 300 to another peripheral portion along the (110) crystal axis direction. Specifically, the P-type diffusion gage layer 301 has turnover (U-shaped) portions (i.e., a meandering portion) at the center portion on the front surface of the P-type silicon substrate 300 as shown in FIG. 10, and the longitudinal portion of each turnover portion at the meandering portion is designed along the <110> crystal axis direction.

Furthermore, the N-type diffusion layer 302 is formed at one peripheral portion on the front surface of the P-type silicon substrate 300. The N-type diffusion layer 302 is formed by doping or diffusing impurities such as phosphorous or the like.

The N-type diffusion layer 302 is located between the P-type diffusion gage layer 301 and the inside of the P-type silicon substrate 300 (P-portion) so as to cover the P-type diffusion gage layer 301 in an area excluding the end portion of the P-type diffusion gage layer 301 at the other peripheral portion.

As shown in FIG. 9, a P-type diffusion layer 303 is equipped on the back surface of the P-type silicon substrate 300. The P-type diffusion layer 303 is also formed by doping or diffusing impurities such as boron or the like.

Silicon oxide film 304 is formed as insulating film on the front surface of the P-type silicon substrate 300 by thermal oxidation or the like so as to cover the front surface of the P-type silicon substrate 300 as shown in FIG. 9. Furthermore, the first electrode 35a is formed on the silicon oxide film 304 at the front surface side of the P-type silicon substrate 300, and the second electrode 35b is formed at the back surface side of the P-type silicon substrate 300.

In this case, the first and second electrodes 35a and 35b are formed over substantially the entire surface area of the front and rear surfaces of the P-type silicon substrate 300. Furthermore, the first electrode 35a is bonded and electrically connected to the pressure transmitting member 20 through the conductive adhesive material 40, and the second electrode 35b is electrically connected to the lead member 50 through the conductive adhesive material 40 as shown in FIG. 9.

This embodiment may be also modified so that the first electrode 35a is disposed at the peripheral portion of the pressure transmitting member 20 located at the center portion on the front surface of the P-type silicon substrate 300, and so that the first electrode 35a and the pressure transmitting member 20 are electrically connected to each other through the conductive adhesive material 40. In this case, the first electrode 35a may be formed at only the left side of the substrate 300 as shown in FIG. 10.

Referring to FIG. 10, at the front surface side of the P-type silicon substrate 300, a contact hole 304a is formed in the silicon oxide film 304 at the position corresponding to the N-type diffusion layer 302 and one end portion of the P-type diffusion gage layer 301 covered by the N-type diffusion layer 302. The first electrode 35a is electrically connected to the N-type diffusion layer 302 and the one end portion of the P-type diffusion gage layer 301 through the contact hole 304a under ohmic contact.

Furthermore, the second electrode 35b is formed substantially over the entire surface area of the back surface side of the P-type silicon substrate 300, and the second electrode 35b and the P-type diffusion layer 303 are electrically connected to each other under ohmic contact as the back surface side concerned.

As described above, the P-type silicon substrate 300 includes the respective diffusion layers 301, 302, 303, the silicon oxide film 304 and the first electrode 35a, all of which are formed on the front surface of the substrate 300. The substrate 300 also includes the second electrode 35b formed on its back surface. These elements can be manufactured by using well-known semiconductor manufacturing techniques.

As shown in FIGS. 9 and 10, according to the construction using the semiconductor substrate 300 comprising the P-type silicon substrate 300 whose plane direction corresponds to the (110)-plane, the pressure detection can be performed as follows.

A voltage is applied to the semiconductor substrate, that is, the P-type silicon substrate 300 through the pressure transmitting member 20 and the lead member 50 so that the first electrode 35a is set to a positive potential and the second electrode 35b is set to a negative potential. This voltage applied state is the same as the second embodiment.

Under this voltage applied state, current flows as indicated by an arrow of FIG. 9. That is, the current flows from the first electrode 35a through the P-type diffusion gage layer 301, the inside of the P-type silicon substrate 300 (P⁻-type portion), the P-type diffusion layer 303 to the second electrode 35b in this order. At this time, current flows mainly along the <110> crystal axis direction in the P-type diffusion gage layer 301.

At this time, the N-type diffusion layer 302 covering the P-type diffusion gage layer 301 secures the electrical insulation between the P-type diffusion gage layer 301 and the inside of the P-type silicon substrate 300 (P⁻type portion), and maintains a normal current flow.

When the pressure F is applied to the P-type silicon substrate 300 in the spacing direction of both the front and back surfaces, the P-type silicon substrate 300 is distorted in the thickness direction thereof and the resistance value along the <110> crystal axis direction in the P-type diffusion gage layer 301 is varied. Therefore, The pressure detection can be performed by outputting the current or voltage variation caused by the pressure application as an electrical signal from the first and second electrodes.

In the pressure detecting device of this embodiment, the semiconductor substrate 300 is also designed so that the electrodes 35a and 35b are equipped on the front and back surfaces of the substrate 300 and both the front and back surfaces are sandwiched by the conductive pressure transmitting member 20 and the lead member 50, so that no wire bonding is required for lead-out of the electrodes 35a, 35b on the front and back surfaces of the semiconductor substrate 200.

Therefore, it is unnecessary to dispose the lead member for wire bonding on the outer periphery of the semiconductor substrate 300 as in the case of the conventional pressure detecting device, and thus the size of the housing 10 an be more reduced to a size nearer to the semiconductor substrate 300. As described above, according to this embodiment, there can be provided a pressure detecting device having a construction suitable to reduce the size of the housing 10.

(Fourth Embodiment)

Figure 11:
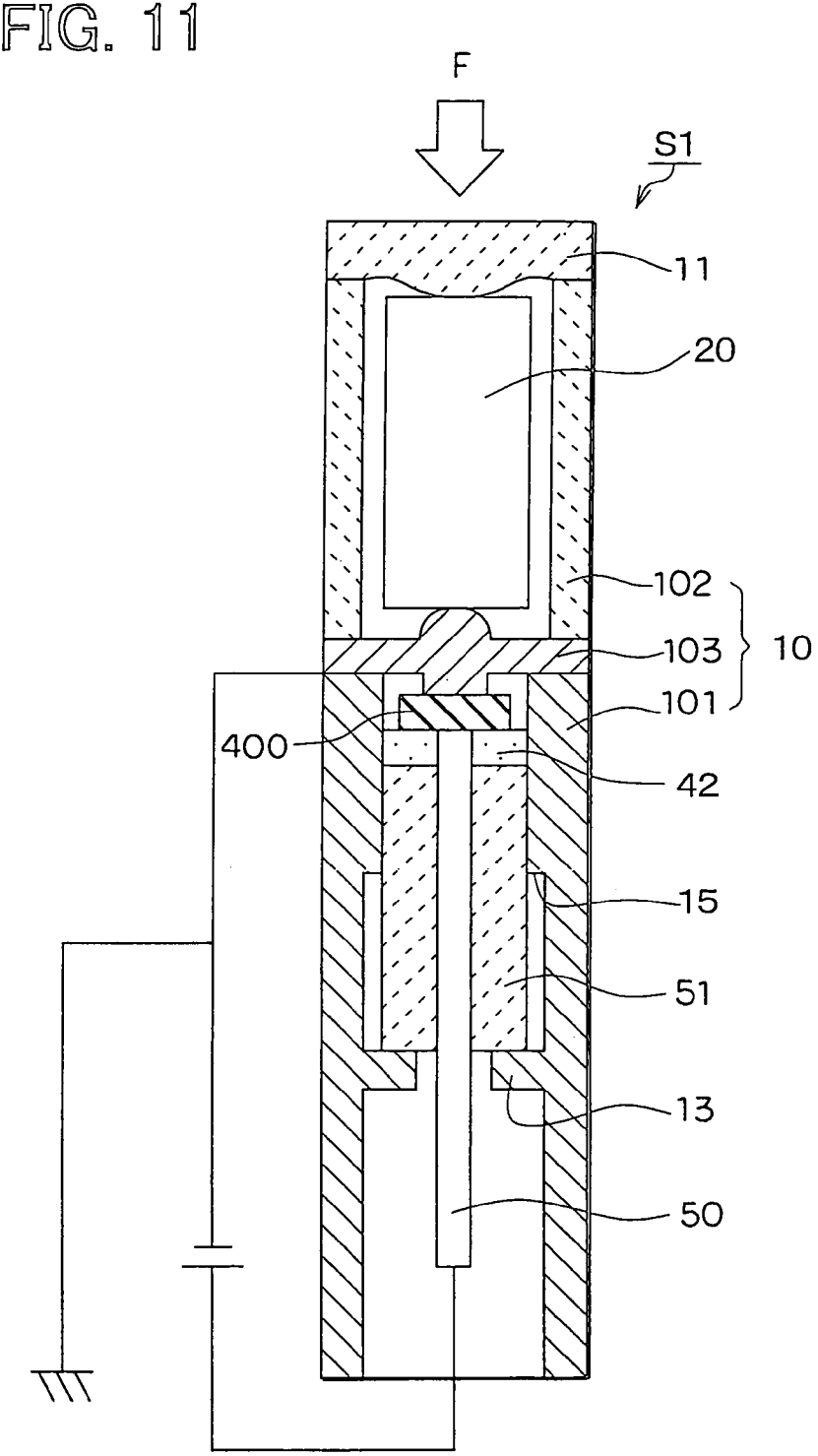
FIG. 11 is a cross-sectional view showing the overall construction of a pressure detecting device according to a fourth embodiment of the pressure detecting device.

Referring to FIG. 11, a fourth embodiment of the pressure detecting device will be discussed by emphasizing differences with the first embodiment. In this embodiment, The housing 10 is designed in a substantially cylindrical form as a whole, and it comprises a first portion 101 located at one end (lower end in FIG. 11) side thereof, a second portion 102 which is located at the other end (upper end in FIG. 11) side thereof and has smaller thermal conductivity than the first portion 101, and an electrically conductive partition portion 103 through which the first portion 101 and the second portion 102 are partitioned.

For example, the first portion 101 and the partition portion 103 are formed of metal such as stainless steel or the like, and the second portion 102 is formed of a ceramic material such as alumina or the like. In this case, the first portion 101 and the partition portion 103 are fixedly bonded to each other by adhesion, welding or the like, and the second portion 102 and the partition portion 103 are fixedly bonded to each other by adhesion or the like.

A pressure transmitting member 20 for transmitting pressure P to the semiconductor substrate 400 is equipped in the second portion 102. In this embodiment, the pressure transmitting member 20 also has smaller thermal conductivity than the first portion 101 of the housing 10, and specifically it is formed of the same material as the second portion 102 of the housing 10 such as, for example, a ceramic material or the like.

In this embodiment, the pressure transmitting member 20 is designed in a cylindrical form, and it is accommodated in the second portion 102 of the housing 10 while one end thereof is brought into contact with the diaphragm 11 and the other end thereof is brought into contact with the partition portion 103. The partition portion 103 is designed in a disc shape having projections on the upper and lower surfaces at the center portion thereof, and one projection of the partition portion 103 comes into contact with the pressure transmitting member 20. The semiconductor substrate 400 is mounted inside one end portion (an end portion at the partition portion 103 side) of the first portion of the housing 10.

The front surface of the semiconductor substrate 400 comes into contact with the projection of the partition portion 103. A lead member 50 which is electrically independent of the housing 10 is mounted at the back surface side of the semiconductor substrate 400 in the first portion 101 of the housing 10.

The lead member 50 is designed as a metal rod formed of copper or the like, and the lead member 50 is inserted and held in a cylindrical lead holder 51 formed of electrically insulating ceramic material such as alumina or the like. The gap between the lead holder 41 and the lead member 40 is sealed by hermetic glass or the like.

The end portion at the semiconductor substrate 400 side of the lead member 50 projects from the lead holder 51, which comes into contact with the back surface of the semiconductor substrate 400. Furthermore, an end portion of the lead member 50 which comes into contact with the back surface of the semiconductor substrate 400 is inserted in an electrically insulating ring 42 formed of ceramic or the like, and the semiconductor substrate 400 is also supported by the ring 42. The other end portion of the lead member 50 at the opposite side to the semiconductor substrate 400 is projected from the lead holder 51 so that the lead member 50 is allowed to be electrically connected to an external wiring member (not shown).

In the pressure detecting device Si as described above, the pressure F received by the diaphragm 14 is transferred from the pressure transmitting member 20 located at the front surface (upper surface in FIG. 11) side of the semiconductor substrate 400 through the partition plate 103 to the front surface of the semiconductor substrate 400.

Here, the pressure is applied to the semiconductor substrate 400 in the direction along which the front and back surfaces thereof are spaced from each other, and the electrical signal output from (the electrodes of) the semiconductor substrate 400 is varied in accordance with variation of the pressure P.

Next, the detailed construction of the semiconductor substrate 400 according to this embodiment will be described with reference to FIG. 12.

Figure 12:
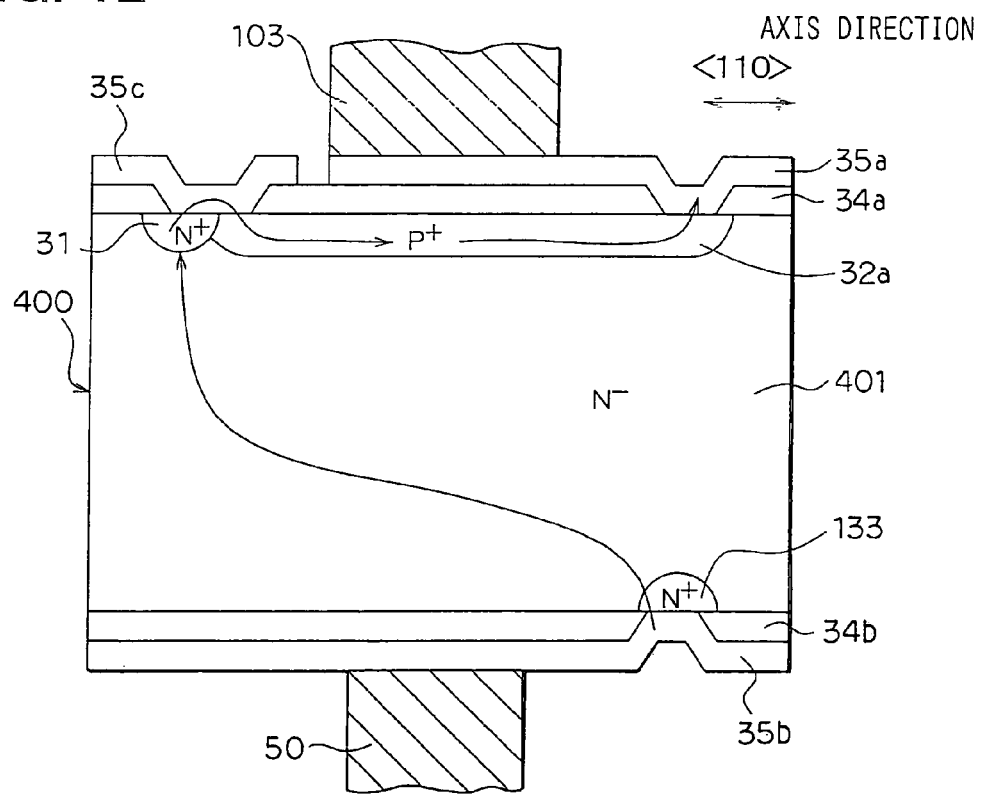
FIG. 12 is an enlarged view showing of the semiconductor substrate of FIG. 11 and its immediate vicinity.

FIG. 12 is an enlarged view showing the semiconductor substrate 400 in FIG. 11 and its immediate vicinity. The semiconductor substrate 400 is formed of $N^-$-type silicon substrate 401, for example, and it has <110> crystal axis on the planes of the front and back surfaces of the silicon substrate 401. The front and back surfaces of the silicon substrate 401 are coincident with the front and back surfaces of the semiconductor substrate 400, respectively.

A first $N^+$ layer 31 is formed on the surface of the silicon substrate 401 by doping or diffusing impurities such as phosphorus or the like, and also a $P^+$ layer 32a is formed on the surface of the silicon substrate 401 by doping or diffusing impurities such as boron or the like so as to be adjacent to the first $N^+$ layer 31 and extend along the <110> crystal axis direction. Furthermore, a second $N^+$ layer 133 is formed on the back surface of the silicon substrate 401 also by doping or diffusing impurities such as boron or the like.

Thereafter, silicon oxide film 34a, 34b is formed by thermal oxidation or the like so as to cover the front and back surfaces of the silicon substrate 401, and then electrically conductive film 35a, 35b, 35c is formed of alumina or the like by sputtering, deposition or the like so as to cover the silicon oxide film 34a, 34b.

Here, a contact hole is formed in the silicon oxide film 34a at the surface side of the silicon substrate 401 so as to be located at the position corresponding to the junction interface between the first $N^+$ layer 31 and the $P^+$ layer 32a, and the junction interface concerned and the electrically conductive film 35c are electrically connected to each other. The electrically conductive film 35c is designed as a relay electrode 35c.

Furthermore, a contact hole is formed in the silicon oxide film 34a at the surface side of the silicon substrate 401 so as to be located at the position corresponding to the end portion of the $P^{30}$ layer 32a at the opposite side to the junction interface between the first $N^+$ layer 31 and the $P^{30}$ layer 32a, and the end portion of the $P^{30}$ layer 32a concerned and the electrically conductive film 35a are electrically connected to each other. The electrically conductive film 35a is designed as a first electrode 35a.

Still furthermore, a contact hole is formed in the silicon oxide film 34b at the back surface side of the silicon substrate 401 so as to be located at the position corresponding to the second $N^+$ layer 133, and the second $N^+$ layer 133 and the electrically conductive film 35b are electrically connected to each other. The electrically conductive film 35b is designed as a second electrode 35b.

As described above, the semiconductor substrate 400 has the first electrode 35a on the front surface thereof, and the second electrode 35b on the back surface thereof. Such a semiconductor substrate 400 can be manufactured by using a well-known semiconductor manufacturing technique.

As shown in FIG. 12, the first electrode 35a at the surface side of the semiconductor substrate 400 is brought into electrical contact with the projection of the partition portion 103 of the housing 10. In addition, the second electrode 35b at the back surface side of the semiconductor substrate 400 is brought into electrical contact with the lead member 50.

Here, the first and second electrodes 35a, 35b may be brought into direct contact with the partition portion 103 and the lead member 50 respectively to establish the electrical conduction therebetween, or they may be brought into contact with the partition portion 103 and the lead member 50 respectively through electrically conductive adhesive agent, silver paste or the like. Particularly, the first electrode 35a is located at the pressure receiving side, and thus it is preferable that the partition portion 103 and the first electrode 35a are fixed to each other through electrically conductive hard adhesive agent.

In the semiconductor substrate 400 as described above, a voltage is applied to the semiconductor substrate 400 through the partition portion 103 and the lead member 50 so that the first electrode 35a is set to ground potential and the second electrode 35b is set to positive potential. This voltage-applied state is shown in FIG. 11.

This voltage-applied state is implemented by bonding an external wiring member such as a connector or the like to one end of the housing in FIG. 11 (the lower end in FIG. 11) so that the lead member 50 is set to the positive potential and the first portion 101 of the housing 10 electrically-conducted to the partition portion 103 is set to ground potential.

Under the voltage-applied state described above, current flows in the direction as indicated by an arrow in FIG. 12. That is, current flows from the second electrode 35a and the second N$^+$ layer 133 at the back surface side through the inside of the silicon substrate 401 to the first N$^+$ layer 31, the relay electrode 35c and the P$^{30}$ layer 32a at the front surface side. In the P$^{30}$ layer 32a, current flows to the first electrode 35a along the <110> crystal axis direction.

In this case, when the pressure P received by the diaphragm 11 is transmitted through the pressure transmitting member 20 and the partition portion 103 to the front surface of the semiconductor substrate 400, the pressure is applied to the semiconductor substrate 400 in the direction along which the front and back surfaces of the semiconductor substrate 400 are spaced from each other, and thus distortion occurs in the semiconductor substrate 400. At this time, the resistance value of the P$^{30}$ layer 32a in the semiconductor substrate 400 is varied in accordance with this distortion, and the current flowing in the semiconductor substrate 400 is also varied due to the variation of the resistance value. The variation of the current is detected as an electrical signal between the first and second electrodes 35a, 35b to determine the applied pressure.

As described above, according to this embodiment, in the semiconductor substrate 400 for outputting the electrical signal corresponding to the pressure applied in the direction along which the front and back surfaces of the semiconductor substrate are spaced from each other (disclosed in the Japanese Patent No. 3166015), the first and second electrodes 35a and 35b are formed on the front and back surfaces of the semiconductor substrate 400, and the electrical signal is output from the first and second electrodes 35a and 35b.

Furthermore, in the pressure detecting device S1 of this embodiment, the electrodes 35a, 35b are formed on the front and back surfaces of the semiconductor substrate 400, and the partition portion 103 of the housing 10 and the lead member 50 are equipped so that the front and back surfaces of the semiconductor substrate 400 are sandwiched by the partition portion 103 and the lead member 50, so that no wire bonding is required for the lead-out of the electrodes 35a, 35b on the respective surfaces of the semiconductor substrate 400.

Therefore, unlike the conventional pressure detecting device, it is unnecessary to arrange lead members for wire bonding on the outer periphery of the semiconductor substrate 400, and thus the housing 10 can be reduced in size to approximately the size of the semiconductor substrate 400.

Furthermore, when the pressure detecting device S1 of this embodiment is applied as a combustion pressure sensor, the second portion 102 serving as a mount portion for the pressure transmitting member 20 in the housing 10 is inserted in a hole of an engine block, and the second portion 102 of the housing 10 is exposed to a high-temperature measurement environment.

Here, according to this embodiment, the second portion 102 of the housing 10 located at the high-temperature measurement environment side is lower in thermal conductivity than the first portion 101, so that the heat from the measurement environment can be suppressed from being transmitted to the semiconductor substrate 400.

As described above, according to this embodiment, there can be provided a pressure detecting device S1 that can suppress increase in temperature of the semiconductor substrate 400 with reducing the size (diameter) of the housing 10 as compared with convention pressure detecting devices.

The pressure transmitting member 20 may be formed of metal such as stainless or the like. However, if the pressure transmitting member 20 is designed to have smaller thermal conductivity than the first portion 101 of the housing 10 like the above embodiment, it would be apparent that the effect of suppressing the heat transfer from the measurement environment to the semiconductor substrate 30 can be made more remarkable.

Furthermore, according to this embodiment, the diaphragm 11 exposed to the measurement environment is also formed of ceramic material, so that the effect of suppressing the thermal conduction to the semiconductor substrate 30 can be enhanced. The diaphragm 11 may be formed of metal such as stainless or the like.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pressure detecting device comprising:

a semiconductor substrate for outputting an electrical signal in accordance with pressure applied in a thickness direction of the semiconductor substrate, wherein the semiconductor substrate has a first electrode on a front surface thereof and a second electrode on a back surface thereof, the electrical signal being output through the first electrode and the second electrode when the pressure is applied;

a pressure transmitting member that is equipped at the front surface side of the semiconductor substrate and that transmits pressure to the front surface side of the semiconductor substrate, wherein the pressure transmitting member has electrically conductive properties, wherein the first electrode is electrically connected to the pressure transmitting member;

a housing in which the semiconductor substrate and the pressure transmitting member are accommodated, wherein the pressure transmitting member is electrically connected to the housing; and a lead member electrically independent of the housing and accommodated in the housing at the back surface side of the semiconductor substrate, wherein the lead member and the second electrode are electrically connected to each other.

2. The pressure detecting device according to claim 1, wherein the first electrode is disposed at the peripheral portion on the front surface of the semiconductor substrate, the pressure from the pressure transmitting member is transmitted to the center portion on the front surface of the semiconductor substrate, and the first electrode and the pressure transmitting member are electrically connected to each other through conductive adhesive material.

3. The pressure detecting device according to claim 2, wherein the first electrode is designed in a ring shape.

4. The pressure detecting device according to claim 1, wherein:
   the semiconductor substrate is a P-type silicon substrate having plane direction corresponding to (110)-plane;
   the pressure from the pressure transmitting member is transmitted to the entire portion on the front surface of the P-type silicon substrate;
   a first P-type diffusion layer electrically-connected to the first electrode is equipped on the front surface of the P-type silicon substrate;
   a second P-type diffusion layer electrically-connected to the second electrode is equipped on the back surface of the P-type silicon substrate; and
   the first P-type diffusion layer and the second P-type diffusion layer are respectively disposed at one peripheral portion and the other peripheral portion which confront each other through a center portion of the P-type silicon substrate along the <110> crystal axis direction.

5. The pressure detecting device according to claim 4, wherein the P-type silicon substrate is designed in a rectangular planar shape so that the <110> crystal axis direction thereof is along a diagonal direction of the P-type silicon substrate and the first P-type diffusion layer and the second P-type diffusion layer confront each other along the diagonal direction of the P-type silicon substrate.

6. The pressure detecting device according to claim 1, wherein:
   the semiconductor substrate is a P-type silicon substrate having a plane direction corresponding to (110)-plane;
   the pressure from the pressure transmitting member is transmitted to a center portion on the front surface of the P-type silicon substrate;
   a P-type diffusion gage layer electrically-connected to the first electrode at a peripheral portion of the P-type silicon substrate is on the front surface of the P-type silicon substrate;
   the P-type diffusion gage layer is shaped to extend from the peripheral portion on the front surface of the P-type silicon substrate to the other peripheral portion along the <110> crystal axis direction;
   an N-type diffusion layer electrically-connected to the first electrode is formed at the peripheral portion on the front surface of the P-type silicon substrate so as to be located between the P-type diffusion gage layer and the inside of the P-type silicon substrate to cover the P-type diffusion gage layer except for an area corresponding to the end portion of the P-type diffusion gage layer at the other peripheral portion side; and
   a P-type diffusion layer electrically-connected to the second electrode is equipped on the back surface of the P-type silicon substrate.

7. A pressure detecting device comprising:
   a semiconductor substrate for outputting an electrical signal in accordance with pressure applied in a thickness direction of the semiconductor substrate, wherein the semiconductor substrate has a first electrode on a front surface thereof and a second electrode on a back surface thereof, the electrical signal being output through the first electrode and the second electrode when the pressure is applied;
   a pressure transmitting member that is equipped at the front surface side of the semiconductor substrate and that transmits pressure to the front surface side of the semiconductor substrate, wherein the pressure transmitting member has electrically conductive properties, wherein the first electrode is electrically connected to the pressure transmitting member;
   a housing in which the semiconductor substrate and the pressure transmitting member are accommodated; and
   a lead member electrically independent of the housing and accommodated in the housing at the back surface side of the semiconductor substrate, wherein the lead member and the second electrode are electrically connected to each other, wherein;
   the semiconductor substrate is an N-type silicon substrate having a plane direction corresponding to (110)-plane;
   the pressure from the pressure transmitting member is transmitted to a center portion on the front surface of the semiconductor substrate;
   a first N-type diffusion layer is equipped at a peripheral portion on the front surface of the silicon substrate;
   the semiconductor substrate includes a P-type diffusion gage layer that is continuously formed thereon so as to extend from a vicinity of the first N-type diffusion layer through the center portion of the N-type silicon substrate to the other peripheral portion;
   a second N-type diffusion layer is equipped on the back surface of the N-type silicon substrate;
   the P-type diffusion gage layer is electrically connected to the first electrode at the other peripheral portion on the front surface of the N-type silicon substrate;
   the second N-type diffusion layer is electrically connected to the second electrode on the back surface of the N-type silicon substrate;
   a third electrode for electrically connecting the first N-type diffusion layer; and
   the P-type diffusion gage layer is equipped at the peripheral portion on the front surface of the N-type silicon substrate.

8. The pressure detecting device according to claim 7, wherein the P-type diffusion gage layer is shaped so that the longitudinal direction of resistance is along the <110> crystal axis direction of the N-type silicon substrate at the center portion on the front surface of the N-type silicon substrate.

9. The pressure detecting device according to claim 7, wherein:
   the pressure transmitting member is disposed on the front surface of the semiconductor substrate to face the center portion; and
   the first electrode is disposed to be nearer to the peripheral portion side than the pressure transmitting member and electrically connected to the pressure transmitting member through the conductive adhesive material.

10. The pressure detecting device according to claim 9, wherein the first electrode is electrically connected to the housing through the pressure transmitting member, whereby the first electrode is allowed to be externally electrically connected.

11. The pressure detecting device according to claim 10, wherein the pressure transmitting member and the housing are equipped with a conductive layer having electrical resistance lower than the pressure transmitting member and the housing.

12. A pressure detecting device comprising:
a semiconductor substrate for outputting an electrical signal in accordance with pressure applied in a thickness direction of the semiconductor substrate, wherein the semiconductor substrate has a first electrode on a front surface thereof and a second electrode on a back surface thereof, the electrical signal being output through the first electrode and the second electrode when the pressure is applied;
a pressure transmitting member that is equipped at the front surface side of the semiconductor substrate and that transmits pressure to the front surface side of the semiconductor substrate, wherein the pressure transmitting member has electrically conductive properties, wherein the first electrode is electrically connected to the pressure transmitting member;
a housing in which the semiconductor substrate and the pressure transmitting member are accommodated; and
a lead member electrically independent of the housing and accommodated in the housing at the back surface side of the semiconductor substrate, wherein the lead member and the second electrode are electrically connected to each other, and wherein the first electrode is electrically connected to the housing through the pressure transmitting member, whereby the first electrode is allowed to be externally electrically connected.

13. A pressure detecting device comprising:
a semiconductor substrate for outputting an electrical signal in accordance with pressure applied in a thickness direction of the semiconductor substrate, wherein the semiconductor substrate has a first electrode on a front surface thereof and a second electrode on a back surface thereof, the electrical signal being output through the first electrode and the second electrode when the pressure is applied;
a pressure transmitting member that is equipped at the front surface side of the semiconductor substrate and that transmits pressure to the front surface side of the semiconductor substrate, wherein the pressure transmitting member has electrically conductive properties, wherein the first electrode is electrically connected to the pressure transmitting member;
a housing in which the semiconductor substrate and the pressure transmitting member are accommodated: and
a lead member electrically independent of the housing and accommodated in the housing at the back surface side of the semiconductor substrate, wherein the lead member and the second electrode are electrically connected to each other, and wherein the electrical signal output from the first electrode is externally output through the pressure transmitting member and the housing.

14. A pressure detecting device comprising:
a semiconductor substrate for outputting an electrical signal in accordance with pressure applied in a thickness direction of the semiconductor substrate, wherein the semiconductor substrate has a first electrode on a front surface thereof and a second electrode on a back surface thereof, the electrical signal being output through the first electrode and the second electrode when the pressure is applied;
a pressure transmitting member that is equipped at the front surface side of the semiconductor substrate and that transmits pressure to the front surface side of the semiconductor substrate, wherein the pressure transmitting member has electrically conductive properties, wherein the first electrode is electrically connected to the pressure transmitting member;
a housing in which the semiconductor substrate and the pressure transmitting member are accommodated; and
a lead member electrically independent of the housing and accommodated in the housing at the back surface side of the semiconductor substrate, wherein:
the lead member and the second electrode are electrically connected to each other;
the housing comprises a first portion, a second portion having smaller thermal conductivity than the first portion, and an electrically conductive partition portion through which the first portion and the second portion are separated from each other;
the semiconductor substrate is accommodated in the first portion of the housing;
the pressure transmitting member is accommodated in the second portion of the housing so that pressure is transmitted through the partition portion to the front surface of the semiconductor substrate;
the first electrode of the semiconductor substrate is electrically connected to the partition portion of the housing; and
the lead member and the second electrode of the semiconductor substrate are electrically connected to each other.

15. The pressure detecting device according to claim 14, wherein the first portion of the housing is formed of metal, and the second portion is formed of ceramic material.

16. The pressure detecting device according to claim 14, wherein the pressure transmitting member has smaller thermal conductivity than the first portion of the housing.

17. The pressure detecting device according to claim 14, wherein the pressure transmitting member is formed of same material as the second portion of the housing.

18. A pressure detecting device comprising:
a semiconductor substrate for outputting an electrical signal in accordance with pressure applied in a direction along which both front and back surfaces of the semiconductor substrate are spaced from each other;
a pressure transmitting member that is equipped at the front surface side of the semiconductor substrate and transmits pressure to the front surface side of the semiconductor substrate, and;
a housing in which the semiconductor substrate and the pressure transmitting member are accommodated, wherein the housing comprises a first portion, a second portion having smaller thermal conductivity than the first portion, and an electrically conductive partition portion through which the first portion and the second portion are separated from each other,
wherein the semiconductor substrate is accommodated in the first portion of the housing,
wherein the pressure transmitting member is accommodated in the second portion of the housing so that pressure is transmitted through the partition portion to the front surface of the semiconductor substrate, wherein the semiconductor substrate has a first electrode on the front surface thereof and a second electrode on the back surface thereof, an electrical signal being output from the first electrode and the second electrode when pressure is applied, wherein the first electrode of the semiconductor substrate is electrically connected to the partition portion of the housing; and wherein a lead member electrically independent of the housing is accommodated at the back surface side of the semiconductor substrate in the housing, and the lead member and the second electrode of the semiconductor substrate are electrically connected to each other.

19. The pressure detecting device according to claim 18, wherein the first portion of the housing is formed of metal, and the second portion is formed of ceramic material.

20. The pressure detecting device according to claim 18, wherein the pressure transmitting member has smaller thermal conductivity than the first portion of the housing.

21. The pressure detecting device according to claim 20, wherein the pressure transmitting member is formed of the same material as the second portion of the housing.

* * * * *